(12) United States Patent
Ishizaki et al.

(10) Patent No.: US 10,170,957 B2
(45) Date of Patent: Jan. 1, 2019

(54) CONTROLLING DEVICE INTEGRATED ROTATING ELECTRIC MACHINE

(71) Applicant: Mitsubishi Electric Corporation, Tokyo (JP)

(72) Inventors: Mitsunori Ishizaki, Tokyo (JP); Tomoaki Shimano, Tokyo (JP); Yosuke Uno, Tokyo (JP); Tomohiro Kurita, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 15/132,350

(22) Filed: Apr. 19, 2016

(65) Prior Publication Data

US 2017/0133903 A1    May 11, 2017

(30) Foreign Application Priority Data

Nov. 6, 2015   (JP) ................................ 2015-218077

(51) Int. Cl.
*H02K 5/10* (2006.01)
*H02K 11/40* (2016.01)
(Continued)

(52) U.S. Cl.
CPC ................ *H02K 5/10* (2013.01); *H02K 5/18* (2013.01); *H02K 5/24* (2013.01); *H02K 9/22* (2013.01);
(Continued)

(58) Field of Classification Search
CPC .. H02K 5/18; H02K 5/20; H02K 5/22; H02K 5/225; H02K 9/00; H02K 9/02;
(Continued)

(56) References Cited

U.S. PATENT DOCUMENTS

| | | | |
|---|---|---|---|
| 7,397,223 B2 * | 7/2008 | Kitamura ............. | H02K 11/048 290/40 A |
| 8,008,805 B2 * | 8/2011 | Mizukoshi ............ | H02M 7/003 307/51 |

(Continued)

FOREIGN PATENT DOCUMENTS

WO      2014/188803 A1    11/2014

*Primary Examiner* — Tran Nguyen
(74) *Attorney, Agent, or Firm* — Sughrue Mion, PLLC; Richard C. Turner

(57) ABSTRACT

A controlling device integrated rotating electric machine including a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case, containing the control board and the power module, formed of a power supply wiring and a grounding wiring connected to a battery placed outside, and fixed to a rear side of the heat sink, and a sealing resin body sealing the control board and the power module contained in the case, wherein the smoothing condenser is joined with the power supply wiring and the grounding wiring, and is contained in the container portion.

22 Claims, 15 Drawing Sheets

(51) Int. Cl.
*H02K 11/33* (2016.01)
*H02K 5/18* (2006.01)
*H02K 5/24* (2006.01)
*H02K 9/22* (2006.01)
*H02K 11/04* (2016.01)

(52) U.S. Cl.
CPC ........... *H02K 11/048* (2013.01); *H02K 11/33* (2016.01); *H02K 11/40* (2016.01)

(58) Field of Classification Search
CPC . H02K 9/06; H02K 9/28; H02K 11/04; H02K 11/046; H02K 11/048; H02K 11/05; H02K 11/33
See application file for complete search history.

(56) References Cited

U.S. PATENT DOCUMENTS

| | | | |
|---|---|---|---|
| 2007/0023421 A1* | 2/2007 | Kitamura | H02K 11/048 219/623 |
| 2008/0073986 A1* | 3/2008 | Lee | H02K 5/18 310/71 |
| 2008/0136265 A1* | 6/2008 | Mizukoshi | H02M 7/003 307/89 |
| 2010/0289351 A1* | 11/2010 | Maeda | H02K 11/046 310/64 |
| 2013/0049550 A1* | 2/2013 | Watanabe | F04B 39/121 310/67 R |
| 2014/0077735 A1* | 3/2014 | Shinohara | H02P 25/22 318/400.21 |
| 2015/0216083 A1 | 7/2015 | Kanazawa et al. | |

* cited by examiner

CONTROLLING DEVICE INTEGRATED ROTATING ELECTRIC MACHINE

TECHNICAL FIELD

The present invention relates to a rotating electric machine, and more particularly; to a controlling device integrated rotating electric machine in which a rotating electric machine's main body is combined with a controlling device.

BACKGROUND ART

A rotating electric machine's main body and a controlling device for controlling the rotating electric machine's main body are combined together to build a controlling device integrated rotating electric machine. The rotating electric machines have been installed on motor vehicles and the like (see Patent Document 1, for example). The controlling device of the controlling device integrated rotating electric machine includes a power circuit portion which converts direct current power into alternative current power or alternative current power into direct current power, a smoothing condenser for absorbing ripple currents which are produced by the operation of switching elements constituting the power circuit portion, a field circuit portion for supplying field currents to the field winding of the rotating electric machine's main body, a control circuit portion for controlling; the power control portion and the field circuit portion. The power circuit portion, the smoothing condenser, the field circuit portion and the control circuit portion are stored in a room made up of a heat sink, a case and the like.

CITATION LIST

Patent Literature

Patent Document 1: WO 2014/188803

SUMMARY OF THE INVENTION

Technical Problem

Controlling device integrated rotating electric machines are in many cases installed in engine rooms and utilized there. The controlling device is required to be resistant to humidity and vibration. Accordingly, resins are injected into a room which is constituted by a heat sink and a case, to seal the inside of the controlling device. The resins keep water from entering into a power circuit portion, a field circuit portion and a control circuit portion. Then, the controlling device is improved in the resistance to humidity. Furthermore, the controlling device can have an improved lifetime to vibration, as the surrounding areas of component parts constituting each of the circuit portions are fixed with the resins.

In a case where each of the circuit portions is fixed with a resin, the surroundings of the smoothing condensers are sealed with the resin at the same time. As for the smoothing condenser, electrolysis materials inside thereof produce a gas while in use. The produced gases increase an internal pressure and lead to the destruction of the smoothing condenser before long. As mentioned above, in a case where the outside of a smoothing condenser is also sealed, the gas produced inside the smoothing condenser cannot be exhausted outside. The controlling device will have a shorter use life unfavorably. Then, it is required that the controlling device has a structure in which generated gases can be exhausted outside.

The present invention has been directed at solving these issues described above, and an object of the invention is to prevent resins from sealing the outside of smoothing condensers, when the resins are employed for sealing the controlling device (a power converter circuit) which contains inside a power module and a control board and the smoothing condensers. At the same time, it is also intended to provide a controlling device integrated rotating electric machine having an improved reliability to the humidity and the vibration.

Solution to Problem

According to the present invention, there is provided a controlling device integrated rotating electric machine including: a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case containing the control board and the power module which the power converter circuit has, formed of a power supply wiring and a grounding wiring connected to a battery placed outside, and fixed to a rear side of the heat sink, and a sealing resin body sealing the control board and the power module contained in the case, wherein the smoothing condenser, which the power converter circuit has, is joined with the power supply wiring and the grounding wiring formed to the case, and is contained in the container portion which the heat sink has.

Advantageous Effects of Invention

The controlling device integrated rotating electric machine in accordance with the present invention includes a rotating electric machine's main body, a power converter, a circuit, a heat sink, a case and a sealing resin body. The rotating electric machine's main body has a rotor winding and a stator winding. The power converter circuit is connected to the rotor winding and the stator winding and has a control board and a power module and a smoothing condenser. The heat sink has a container portion swelling out towards a front side and is attached to a rear side of the rotating electric machine's main body. The case contains the control board and the power module which the power converter circuit has, and is formed of a power supply wiring and a grounding wiring connected to a battery placed outside, and is fixed to a rear side of the heat sink. The sealing resin body seals the control board and the power module contained in the case. The smoothing condenser, which the power converter circuit has, is joined with the power supply wiring and the grounding wiring formed to the case, and is contained in the container portion which the heat sink has. The container portion of the heat sink prevents resins from sealing the outside of the smoothing condenser, when the resins are used for sealing the power converter circuit which has the control board. Then, the surroundings of the smoothing condenser are kept from resin sealing. As a result, the controlling device integrated rotating electric machine will have an improved reliability to the humidity and the vibration.

DESCRIPTION OF EMBODIMENTS

Controlling device integrated rotating electric machines according to the embodiments of the present invention will be described hereinafter with reference to the accompanying drawings. Note that, the same or similar constituent components in each drawing are designated at the same numeral references. In addition, while the controlling device integrated rotating electric machine is further configured with a plurality of members in actuality, for simplicity of description, descriptions are made only for parts necessary to describe and are omitted for the other parts.

Embodiment 1

Figure 1:
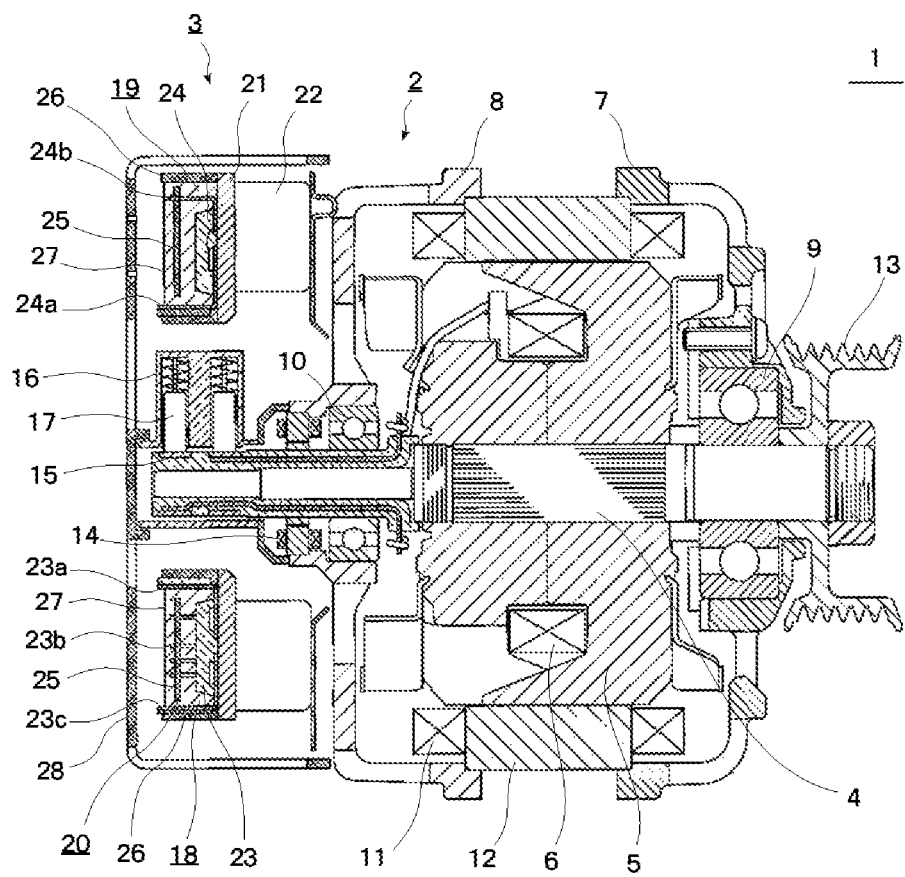
FIG. 1 is a sectional view for illustrating the constitution of a controlling device integrated rotating electric machine in accordance with the embodiments of the present invention.

In the description below, explanations will be given for the controlling device integrated rotating electric machine in accordance with Embodiment 1 of the present invention, with reference to the accompanying drawings. The controlling device integrated rotating electric machines in accordance with the present embodiments are preferably applied to alternating current generating motors used for the assist driving of engines and the generation of electric power. FIG. 1 shows a sectional view for describing the constitution of the controlling device integrated rotating electric machine, which is to be installed in a motor vehicle. The controlling device integrated rotating electric machine 1 consists of a rotating electric machine's main body 2, a controlling device 3 and the like. As for the controlling device integrated, rotating electric machine 1, a portion which is closer to a pulley 13 is referred to as a front side. The direction towards the controlling device 3 from the rotating electric machine's main body 2 is referred to as a rear side. The rotating electric machine's main body 2 has a rotor winding 6 and a stator winding 11.

A rotor 5 is fixed to a rotor shaft 4 of the rotating electric machine's main body 2. A rotor winding 6 is arranged to surround the rotor 5. A bearing 9 is attached to a front bracket 7. A bearing 10 is attached to a rear bracket 8. The rotor shaft 4 is supported by the bearing 9 and the bearing 10 in a rotatable manner. A stator winding 11 is arranged to surround a stator 12. The stator 12 is attached between the front bracket 7 and the rear bracket 8 and sustained there. An end portion of the rotor shaft 4 protrudes from the front bracket 7, and a pulley 13 is attached to the end portion. The rotation of the rotor shaft 4 is transmitted through a transmission belt from the pulley 13 to an engine.

The rotational state of the rotor 5 is detected by a rotational position sensing detector 14. The rear end portion of the rotor shaft 4 protrudes from the rear bracket 8 and the rotational position sensing detector 14 is installed on the rear end portion. A pair of electric slip rings 15 and a pair of brushes 17 are attached to the rotating electric machine's main body 2. The electric slip rings 15 supply electric current to the rotor winding 6. The brushes 17 are sustained in a brush holder 16 and contact to slide with the electric slip rings 15. A controlling device 3 consists of a power circuit portion 18 connected to the stator winding 11 electrically, a field circuit portion 19 connected to the rotor winding 6 electrically, a control circuit portion 20 for controlling the power circuit portion 18 and the field circuit portion 19.

The power circuit portion 18 is made up of power modules 23. The field circuit portion 19 is made up of field modules 24. A control board 25 constitutes a control circuit portion 20. A heat sink 21 is made from metal such as an aluminum alloy, which is low in price and high in thermal conductivity. The heat sink 21 is fixed to the rear bracket 8 and held there. Heat radiating fins 22 are formed, at the rear bracket side (the front side), on a surface of the heat sink 21 to enhance cooling capacity. The power module 23 is installed on the surface of the heat sink 21 opposing to the surface where the heat radiating fins 22 are formed. The power module 23 includes a power supply wiring 23a, a control signal wiring 23b, a stator winding wiring 23c and a grounding wiring 23d (see FIG. 2 for reference).

A single field module 24 is installed on the same surface of the heat sink 21 on which the power module 23 is installed. The field module 24 includes a power supply wiring 24a, a control signal wiring 24b, a plus brush wiring 24c1 (see FIG. 2 for reference), a minus brush wiring 24c2 (see FIG. 2 for reference) and a grounding wiring 24d (see FIG. 2 for reference). The power circuit portion 18, the field circuit portion 19 and the control circuit portion 20 are contained in a case 26. The case 26 is formed of thermoplastic resins like PPS (Poly Phenylene Sulfide), PBT (Poly Butylene Terephthalate) and others, and is configured to have partial openings at a ceiling portion and a base portion. A controlling device cover 28 is installed on a surface of the controlling device 3, the surface opposite to the rear bracket 8. An epoxy resin is poured into the inside of the case 26. A sealing resin body 27 is constituted by the epoxy resin and seals the power circuit portion 18, the field circuit portion 19 and the control circuit portion 20.

Figure 2:
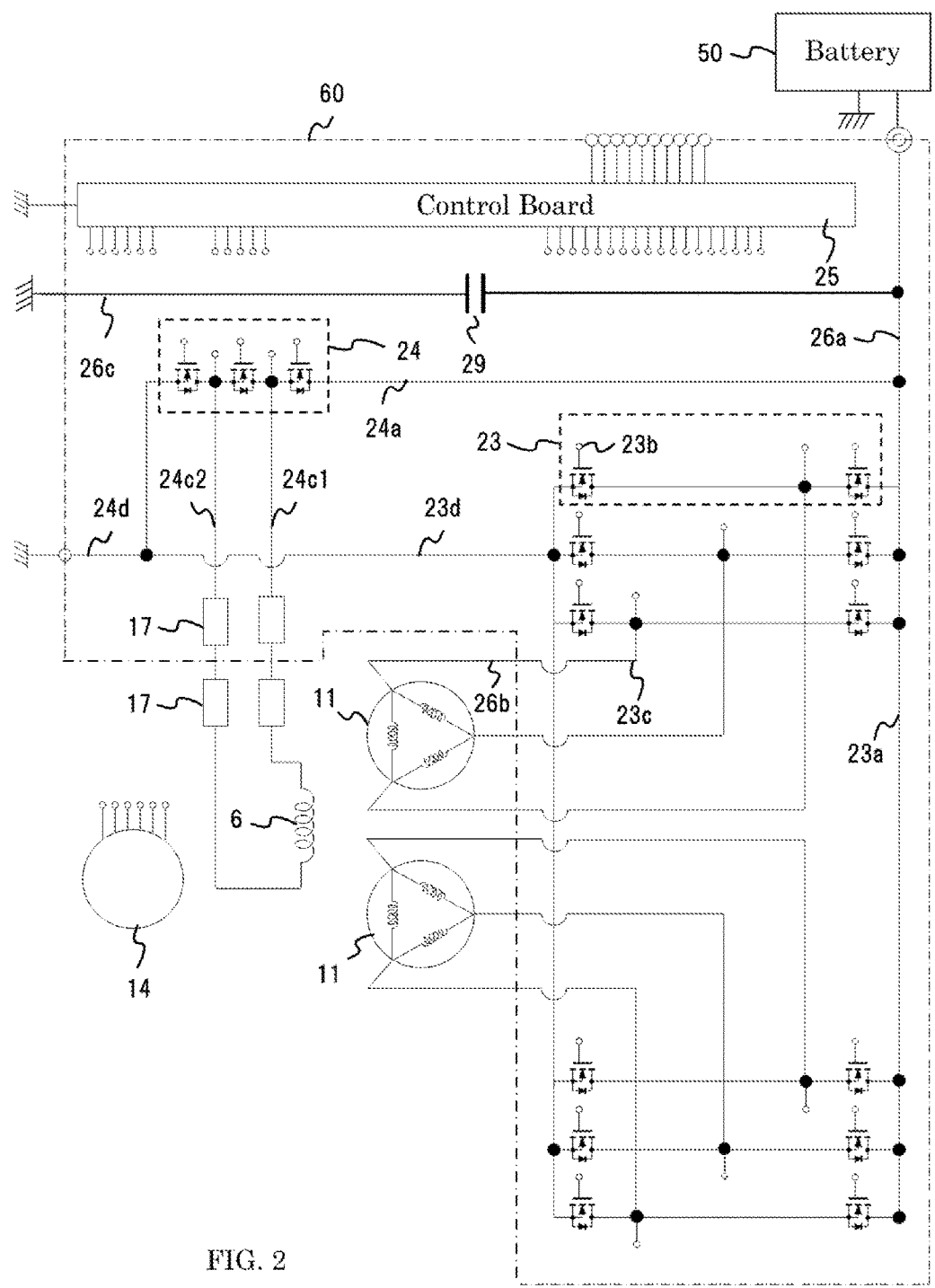
FIG. 2 is an electric circuit diagram for showing the constitution of a power converter circuit in accordance with the embodiments of the present invention.

FIG. 2 is an illustration which shows the schematic electric circuit diagram of the controlling device integrated rotating electric machine. A battery 50 placed outside is connected to a power converter circuit 60. The power converter circuit 60 consists of a power module 23 (the power circuit portion 18), a field module 24 (the field circuit portion 19), a control board 25 (the control circuit portion 20), a smoothing condenser 29 and the like. The power module 23 has two built-in MOSFETs (Metal Oxide Semiconductor Field Effect Transistors) as switching elements. Six power modules 23 constitute two sets of three phase inverter circuits. Glass epoxy resins of preferable electrical characteristic and mechanical properties are employed for the matrix of the control board 25. The smoothing condenser 29 absorbs ripple currents which are produced by the operation of switching elements (the power module 23), constituting the power circuit portion 18.

The field module 24 is formed through mold forming processes. Smoothing condensers 29 are arranged between power supply wirings (a power supply wiring 23a, a power supply wiring 24a, a power supply wiring 26a, a power supply wiring 36a) and grounding wirings (a grounding wiring 23d, a grounding wiring 24d, a grounding wiring 26c, a grounding wiring 36c). On the control board 25, arranged are mounting components for controlling the power circuit portion 18 and the field circuit portion 19, and external connecting connectors, for transmitting and receiving signals between external devices. Smoothing condensers of surface mount type and smoothing condensers of insertion mount type are employed as smoothing condensers 29. The power converter circuit 60 performs power conversion between the stator winding 11 and external direct current power (the battery 50).

Figure 3:
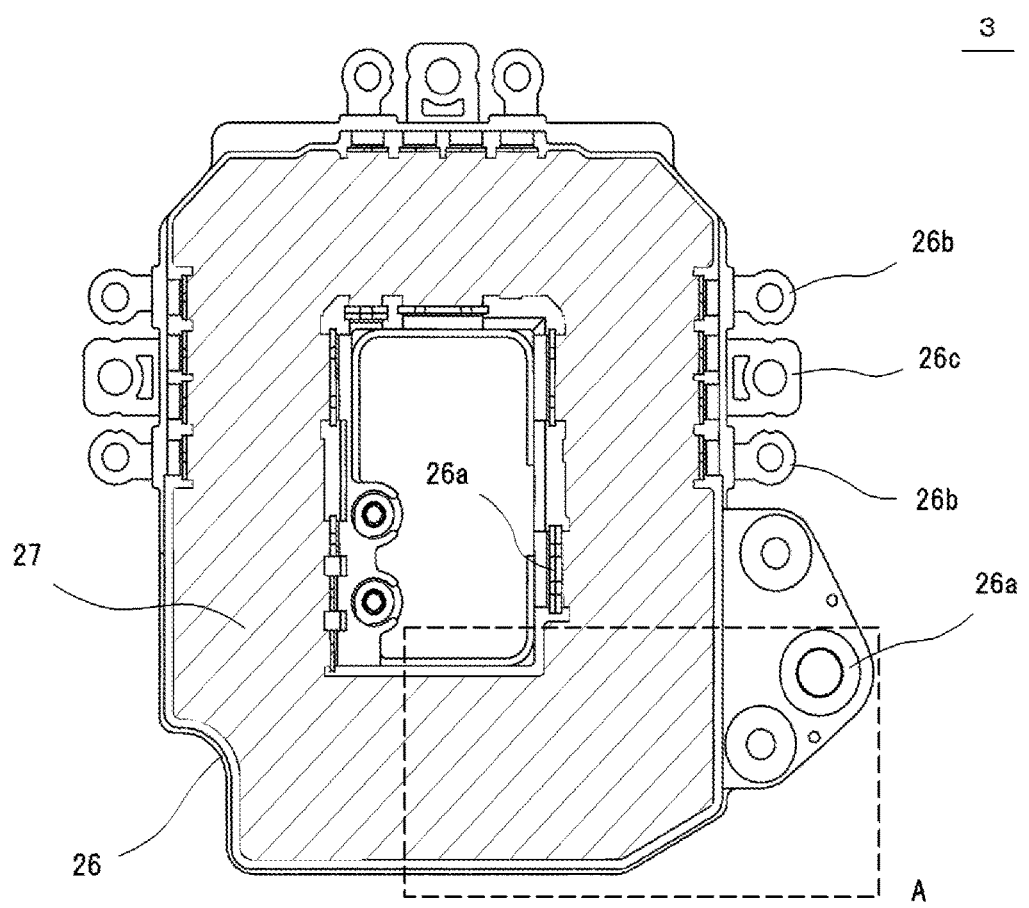
FIG. 3 is a top view for showing the outer appearance of a controlling device in accordance with the embodiments of the present invention.

FIG. 3 is a top view of the controlling device 3, viewed from the direction (the rear side) where the controlling device cover 28 is to be installed. A sealing resin body 27 is formed on the inside of the case 26 and seals the power circuit portion 18 (the power module 23), the field circuit portion 19 (the field module 24) and the control circuit portion 20 (the control board 25). The power supply wiring 26a as well as the grounding wiring 26c are processed by insert molding on the bottom face of the case 26. The grounding wiring 26c is fastened by screws to connect with the heat sink 21, after the case 26 is arranged on the heat sink 21. The power circuit portion 18 is constituted by switching elements (the power module 23). In the region A of the controlling device 3, arranged are the smoothing condensers 29, which absorb ripple currents generated by the operation of the switching elements. An electrolytic capacitor and an electro conductive polymer capacitor are employed, as the smoothing condensers 29.

Figure 4:
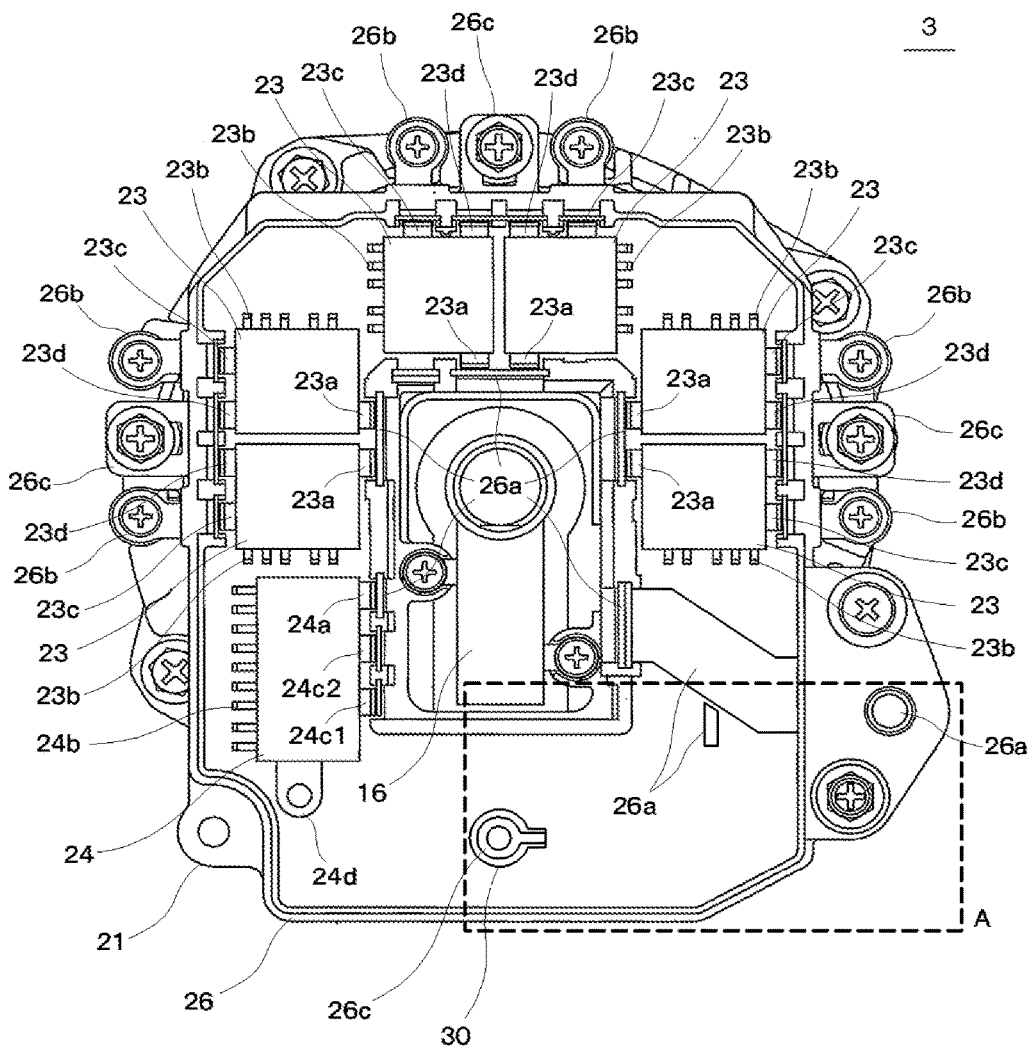
FIG. 4 is a top view for showing the inner structure of the controlling device in accordance with the embodiments of the present invention.

FIG. 4 is a view for illustrating the controlling device 3 of the controlling device integrated rotating electric machine. The sealing resin body 27 and the control board 25 are removed there. The drawing is a top of the controlling device viewed from the direction (the rear side) where the controlling device cover 28 is installed, and shows the power circuit portion and the field circuit portion of the controlling device. The field module 24 includes a power supply wiring 24a for connecting electrically with the battery 50 placed outside, a plus brush wiring 24c1 for passing an electric current to the brush 17 of the plus side, a minus brush wiring 24c2 for passing an electric current to the brush 17 of the minus side, a control signal wiring 24b for connecting with the control board 25 of the control circuit portion, and a grounding wiring 24d for having a same potential with the heat sink 21. The case 26 is fixed to the rear side of the heat sink 21 by screws and adhesives.

Six power modules 23 are provided through mold forming processes and installed on the controlling device 3. Each power module 23 includes a power supply wiring 23a for connecting electrically with the battery 50 placed outside, a stator winding wiring 23c for connecting electrically with the stator winding 11, a control signal wiring 23b for connecting with the control board 25 of the control circuit portion, a grounding wiring 23d for having a same potential with the heat sink 21. Smoothing condensers 29 are arranged in the region A. A power supply wiring 26a, a stator winding wiring 26b and a grounding wiring 26c are made of copper wiring and are formed by insert molding on the bottom face of the case 26. An opening portion 30 is formed in the region A of the case 26.

The controlling device integrated rotating electric machine in accordance with the embodiments of the present invention is constructed in a manner explained above, and has a function of an electric motor for drive assisting the engine and a function of a power generating motor for generating electric power. When the controlling device integrated rotating electric machine 1 functions as driving assistance to the engine, direct current power, supplied to the power circuit portion 18 from the battery 50 placed outside, is converted into three phase alternating current by the ON/OF control of the switching elements (the power module 23) of the power circuit portion 18 and is supplied to the stator winding 11.

The battery 50 placed outside supplies direct current power. The direct current power is adjusted by the field circuit portion 19 and is supplied to the rotor winding 6. Rotating magnetic fields are generated around the rotor winding 6 to rotate the rotor shaft 4. The rotation of the rotor shaft 4 is transmitted from the pulley 13 to an engine (not shown) through a transmission belt (not shown). The control circuit portion 20 (the control board 25) controls the power circuit portion 18 and the field circuit portion 19 based on the information from external devices (not shown) and the rotational position sensing detector 14.

When the controlling device integrated rotating electric machine 1 functions as a generating motor, rotational forces of an engine are transmitted to the rotor shaft 4 through the transmission belt and the pulley 13. Thereby, the rotor 5 rotates, and three phase alternating current electric power is activated in a stator winding 11. The control circuit portion 20 controls ON and OFF of the switching elements (the power modules 23) in a power circuit portion 18 and converts three phase alternating current electric power activated in the stator winding 11 into direct current electric power. The converted direct current electric power is supplied to the battery 50 placed outside, and the battery 50 placed outside is charged.

Figure 5:
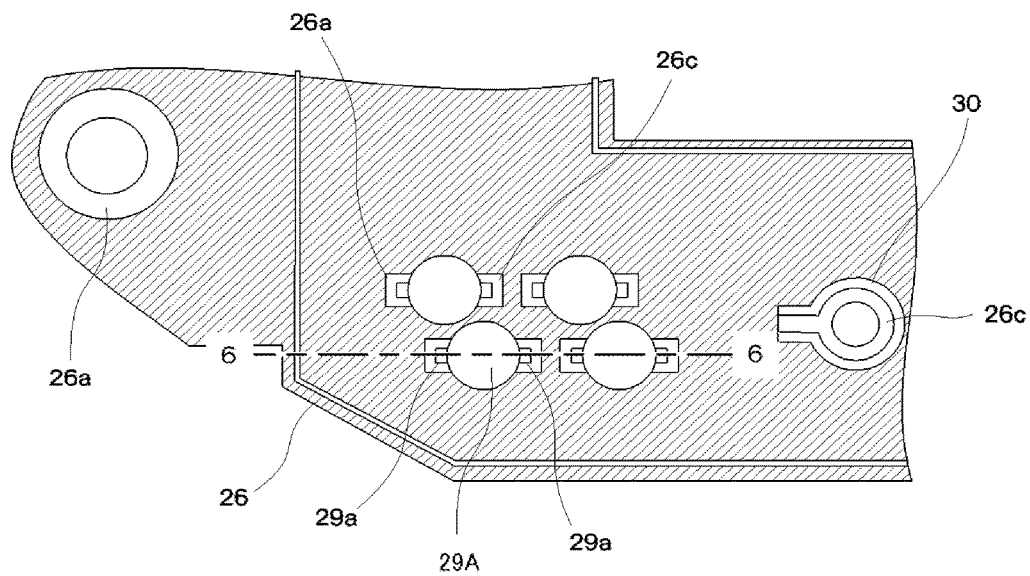
FIG. 5 is a view in accordance with Embodiment 1 of the present invention, for illustrating a top view of a case to which smoothing condensers are connected.

Next, description is made about the constructional arrangement of the smoothing condensers 29 in accordance with Embodiment 1 of the present invention. FIG. 5 shows the region A shown in FIGS. 3 and 4, for illustrating the enlarged area viewed from the direction (the front side) towards the case 26 from the heat sink 21. The drawing above shows a state where the smoothing condensers of surface mount type 29A are connected to metal wirings integrally formed to the case 26. On the bottom face of the case 26, formed are the power supply wiring 26a (an anode metal wiring) and the grounding wiring 26c (a cathode metal wiring), made up of copper wirings integrally formed with the case. The power supply wiring 26a of FIG. 5 and the power supply wiring 26c shown in FIG. 2 are at the same electric potential. After the case 26 has been arranged in the heat sink 21, the grounding wiring 26c is fixed with screws and connected to the heat sink 21.

A smoothing condenser 29 has two leads 29a. The smoothing condenser of surface mount type 29A absorbs ripple currents produced by the operation of the switching elements built-in the power module 23, and four condensers are connected and arranged in parallel according to the present embodiment. Leads 29a of a smoothing condenser of surface mount type 29A are joined to the power supply wiring 26a and the grounding wiring 26c with solders. The smoothing condensers of surface mount type 29A can employ aluminum electrolytic capacitors, electro conductive polymer capacitors, electro conductive polymer hybrid aluminum electrolytic capacitors and the like.

Figure 6:
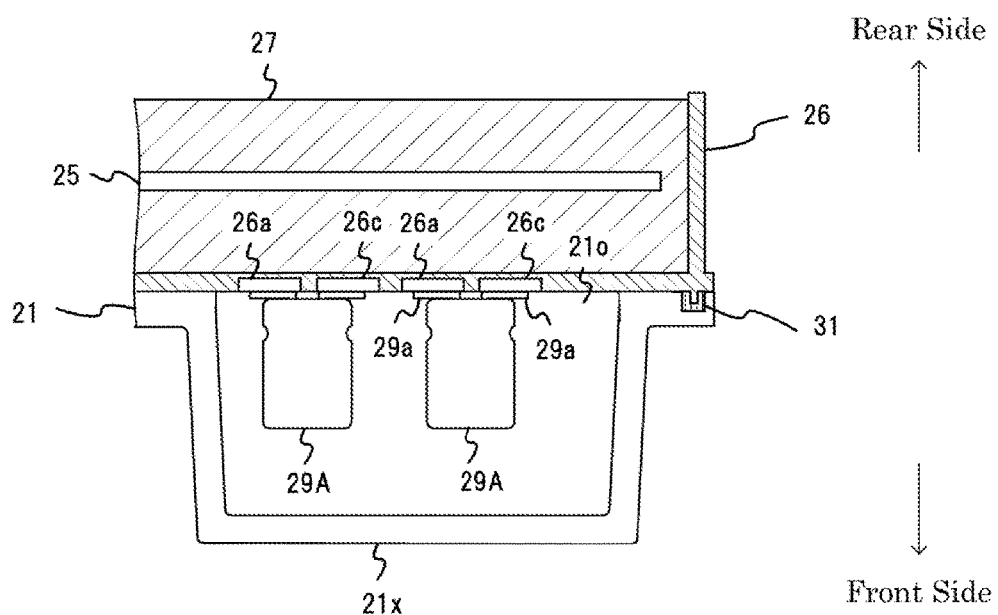
FIG. 6 is an illustration in accordance with Embodiment 1 of the present invention, for showing a sectional view of the resin sealed structure where smoothing condensers are provided in the controlling device.

FIG. 6 shows a sectional view along a sectional line 6-6 shown in FIG. 5, for illustrating the section viewed from the direction of the bottom of FIG. 5. The control board 25, the power module 23 and the field module 24 are contained in the case 26 and the sealing resin body 27 seals them. An opening portion 21o and a container portion 21x are formed in the heat sink 21. The container portion 21x of the heat sink 21 swells out towards the front side and extends along the opposite direction of the surface of the case 26 on which the power module 23 is hold. The smoothing condensers of surface mount type 29A are contained in the room formed by the container portion 21x of the heat sink 21 and the bottom face of the case 26. Because the opening portion 21o of the heat sink 21 is closed with the bottom face of the case 26, a sealing resin does not intrude into the room where the smoothing condensers 29 are hold, even if a sealing resin is poured into the inside of the case 26, The surroundings of the smoothing condensers 29 are not sealed, even if the power circuit portion 18, the field circuit portion 19 and the control circuit portion 20 are sealed with resins. Accordingly, the controlling device 3 can be improved in the reliability to humidity and vibration. At this time, desiccating agents such as a silica gel are allowed to be arranged on the inside of the container portion 21x, when dew condensation is produced on the smoothing condensers 29 of the controlling device 3 owing to the fact that the container portion is hermetically sealed. Further, the smoothing condensers 29 may be damp proof coated with a fluoric resin, a silicone resin, a polyolefin resin, an acrylic acid resin, an electric insulating varnish and the like.

Figure 7:
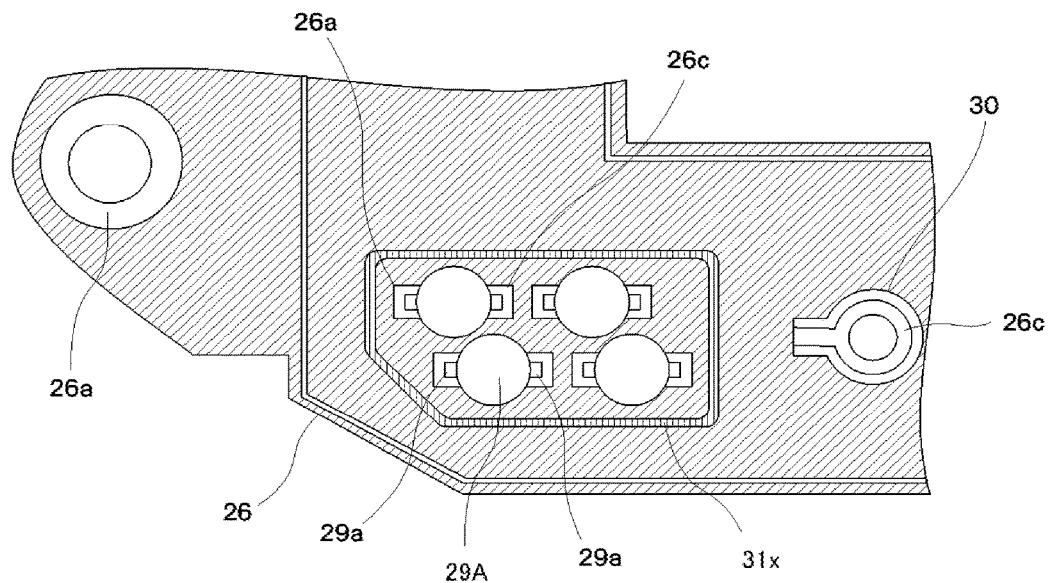
FIG. 7 is an illustration in accordance with Embodiment 1 of the present invention, for showing a top view of a case in a state where the case is coated with a sealant.

FIG. 7 is a view which shows another constructional arrangement of the smoothing condensers 29 in accordance with the present embodiment. The drawing above shows, like FIG. 5, the region A of the controlling device 3, for illustrating the enlargement viewed from the direction (the front side) towards the case 26 from the heat sink 21. On the bottom face of the case 26, an enclosing bund member 31x made from the sealant 31 is arranged to surround the outside of the opening portion 21o of the heat sink 21. The sealant 31 can employ adhesives such as of a silicone system, an epoxy system, an acrylic system, a cyanoacrylate system or an O ring.

Figure 8:
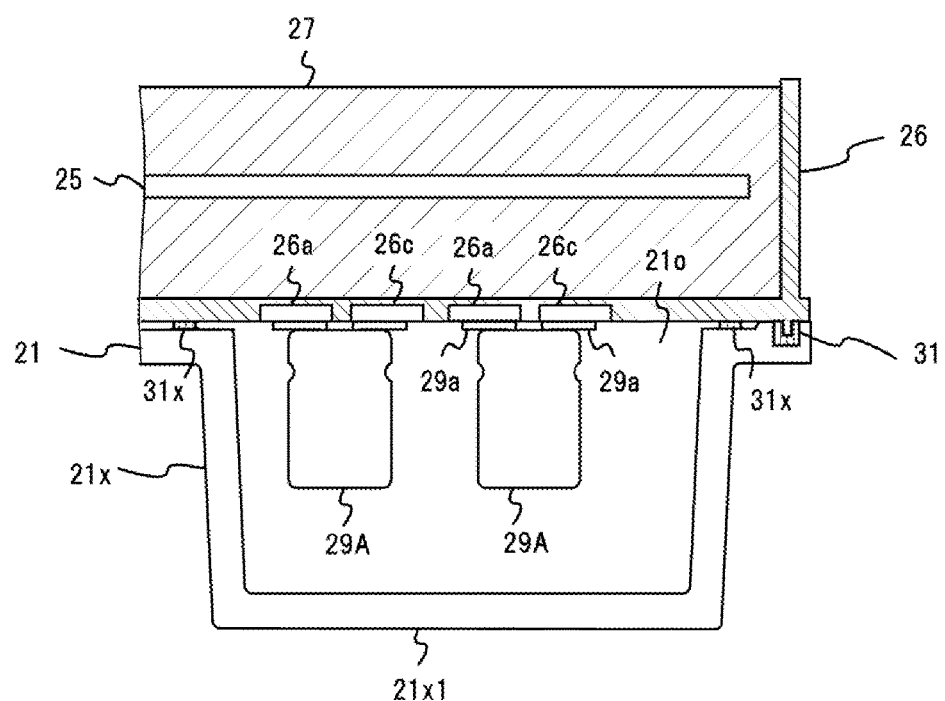
FIG. 8 is an illustration in accordance with Embodiment 1 of the present invention, for showing a sectional view of the case where an enclosing bund member of a sealant is formed.

FIG. 8 shows, as well as FIG. 6, a section viewed from a direction of the bottom of FIG. 7. The case 26 is bonded to the heat sink 21 with the sealant 31 made from a resin. An enclosing bund member 31x of the sealant is formed to the case 26 and surrounds the smoothing condensers 29. The enclosing bund member 31x surrounds the opening portion 21o of the heat sink 21. A sealant 31 is used for gluing the case 26 and the heat sink 21 together. If the enclosing bund member 31x employs the sealant 31, the same facilities used at a gluing process can be applied to a process for coating a bund member. Furthermore, the productivity of the controlling devices will improve, because time and effort in the parts management can be reduced. The enclosing bund member 31x is formed, on the bottom face of the case 26, to surround the opening portion 21o of the heat sink 21. Thus, the enclosing bund member 31x can prevent more surely the intrusion of the sealing resin body 27 into the room where the smoothing condensers 29 are contained.

Figure 9:
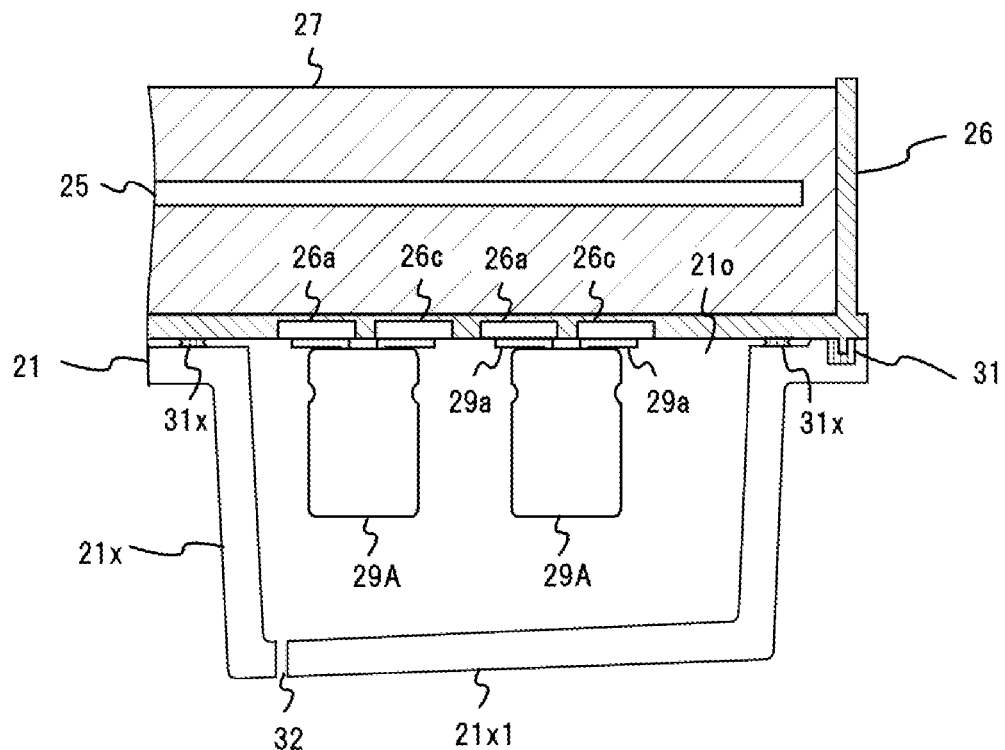
FIG. 9 is an illustration in accordance with Embodiment 1 of the present invention, for showing a sectional view of the case in a state where a through hole is formed on the bottom face of a container portion.

FIG. 9 is a view of another constructional arrangement of the smoothing condensers 29 in accordance with the present embodiment, for illustrating a sectional view like FIG. 6. The smoothing condensers of surface mount type 29A are contained in the container portion 21x. In the present embodiment, a through hole 32 is provided in the container portion 21x of the heat sink 21. The bottom face 21x1 of the container portion 21x is slanted. Adhesives are roughly classified into a type of hardening at a room temperature and a type of hardening with an elevated temperature. The room temperature curing type needs more time for hardening. When a room temperature curing type is employed as adhesives halfway, a following step in assembling processes is late and the productivity will decrease.

On the other hand, thermal curing resins can be hardened in a short time. When the adhesives of thermal curing type are used, an air of the container portion 21x, where smoothing condensers 29 are contained, expands and is exhausted outside on heating. The air removes non-hardened enclosing bund member 31x, and through bores are formed in a sealant. It is probable that sealant intrudes into the sealing resin body 27. If the through hole 32 is provided on the bottom face 21x1 of the container portion 21x, the bores are prevented to be formed in the sealant 31 on heating. The adhesives of thermal curing type with a higher productivity can be employed as the sealant 31.

The intrusion of water to the container portion 21x of the heat sink 21 may become a matter of concern, by establishing a through hole 32 in the container portion 21x. In this case, it is better to provide the through hole on a bottom face, which is made in the container portion 21x of the heat sink 21, when a controlling device integrated rotating electric machine is installed in the vehicle. Further, water intruding into the container portion of the smoothing condenser 29 is easy to be exhausted, if a slant is given to the face on which a through hole is provided and the through hole 32 takes a lowest position. Furthermore, it is preferable to make a damp proof coating on a smoothing condenser 29 with a fluoric resin, a silicone resin, a polyolefin resin, an acrylic acid resin, an electric insulating varnish and the like.

Figure 10:
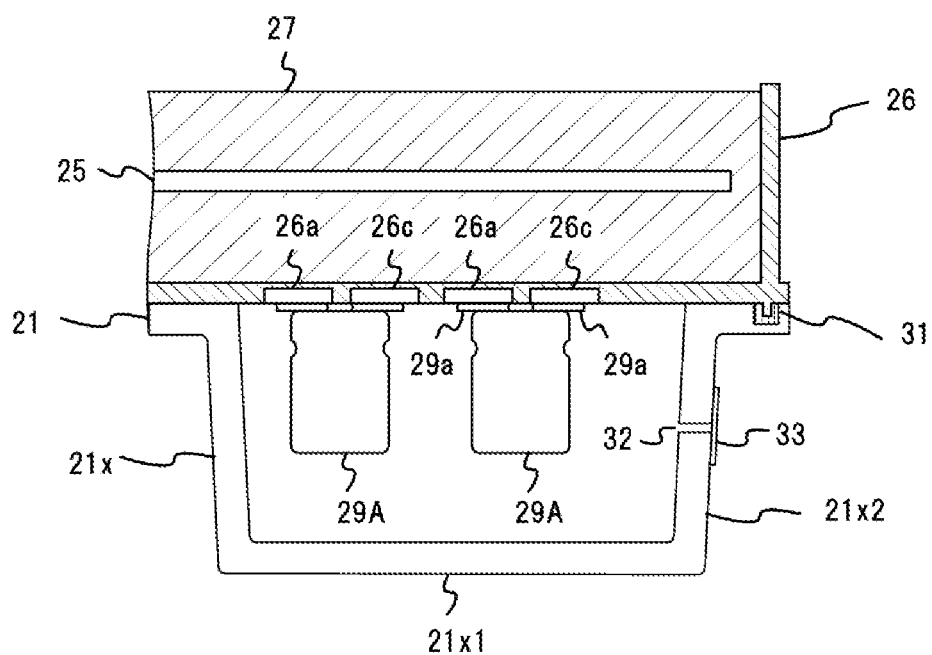
FIG. 10 is an illustration in accordance with Embodiment 1 of the present invention, for showing a sectional view of the case in a state where a through hole is formed on the side face of the container portion.

FIG. 10 is a view of another constructional arrangement of the smoothing condensers 29 in accordance with the present embodiment, for illustrating a sectional view, like FIG. 6. The container portion 21x of the heat sink 21 has a through hole 32 formed at a side face 21x2. If the through hole 32 of the heat sink 21 is closed with a filter 33 in a step after the resin sealing of the case 26 is completed, malfunctions of smoothing condensers by the intrusion of water can be prevented. Further, the through hole can be closed with adhesives of curing at a room temperature type, after the last step, for example. The through hole may be closed with a filter having waterproof property and aeration property, containing porous films of 4 ethylene fluoride. The filter enhances the prevention of dew condensation in the container portion, in addition to the prevention of the water intrusion. The filter having waterproof property and aeration property, may be arranged before the step of sealing the case 26 with resins, and may be arranged in either the outside or the inside of the container portion of the smoothing condensers 29.

Figure 11:
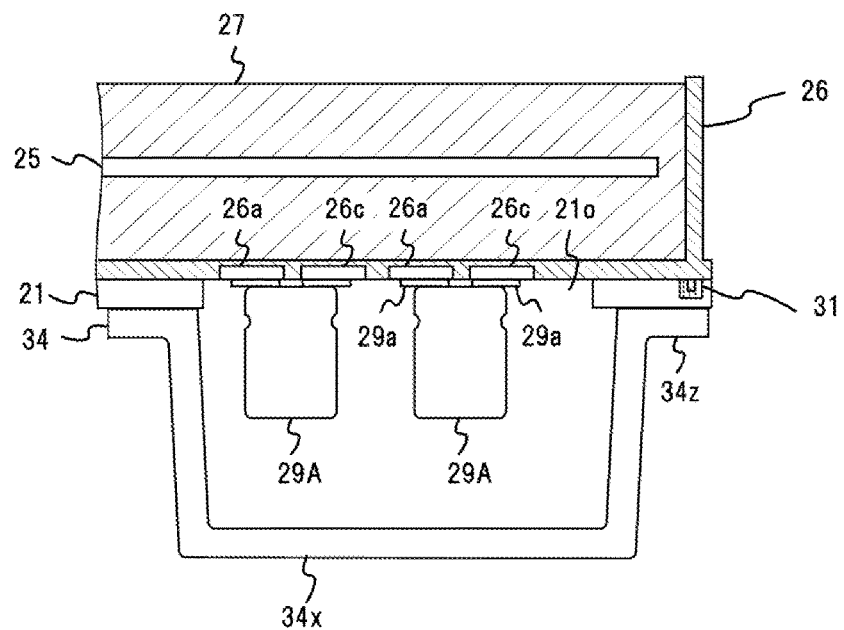
FIG. 11 is an illustration in accordance with Embodiment 1 of the present invention, for showing a sectional view of the case in a state where smoothing condensers are contained in the container portion of a cover.

FIG. 11 is a view of another constructional arrangement of the smoothing condensers 29 in accordance with the present embodiment, for illustrating a sectional view like FIG. 6. A cover 34 is a different member of the heat sink 21 and has a container portion for containing the smoothing condensers 29. The container portion 34x of the cover 34 swells out towards the front side. The cover 34 is attached to the front side of the heat sink 21. The heat sink 21 is fixed to the rear side of the rotating electric machine's main body, and has an opening portion 21o formed at a location corresponding to the container portion 34x of the cover 34. The brim portion 34z of the cover 34 can be attached to the heat sink 21 after the resin sealing is completed. The embodiment makes it possible to confirm that a sealing resin body 27 does not leak out to the container portion of the smoothing condenser 29 and prevent defective products from putting into a market. The brim portion 34z of the cover 34 is fixed to the heat sink 21 with screws and/or adhesives. The cover 34, like the heat sink 21, may be formed of metals such as an aluminum alloy and may be also formed of thermoplastic resins such as PPS, PBT and the like.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case containing the control board and the power module which the power converter circuit has, formed of a power supply wiring and a grounding wiring connected to a battery placed outside, and fixed to a rear side of the heat sink, and a sealing resin body sealing the control board and the power module contained in the case, wherein the smoothing condenser, which the power converter circuit has, is joined with the power supply wiring and the grounding wiring formed to the case, and is contained in the container portion which the heat sink has.

According to the controlling device integrated rotating electric machine in accordance with the present invention, smoothing condensers are stored in the container portion of the heat sink and the opening portion of the container portion is closed with the bottom face of the case. In a case where resins are poured to seal a power converter circuit having a control board, the surroundings of the smoothing condensers are not sealed with the resins. Accordingly, the controlling device has an improvement in the reliability to humidity and vibration. Further, in a controlling device integrated rotating electric machine according to the present invention, the bottom face of the container portion is preferably slanted. Further, in a controlling device integrated rotating electric machine according to the present invention, an enclosing bund member made of a resin is preferably provided to the case to surround the smoothing condenser. According to the controlling device integrated rotating electric machine in accordance with the present invention, the smoothing condensers are secured against the intrusion of resins into the container portion. The embodiment can reduce the possibility that a sealant leaks from the opening portion of the heat sink, when a power converter circuit having a control board is sealed with resins. According to the controlling device integrated rotating electric machine in accordance with the present invention, smoothing condensers can have an improved resistance to water, by employing an enclosed structure to the smoothing condensers.

Further, in a controlling device integrated rotating electric machine in accordance with the present invention, a through hole is formed on a bottom face of the container portion which the heat sink has. A silicone adhesive can be employed, for example, as a sealant. On the other hand, adhesives are used to attach a case to a het sink. It is desirable for an improved productivity that both of the case and the het sink are coated and cured at the same time. Adhesives are classified into a type of hardening at a room temperature and a type of hardening at an elevated temperature. An adhesive of room temperature curing type needs more time for hardening. When a room temperature curing type is employed as an adhesive halfway, a following step in assembling processes is late and the productivity will decrease. In contrast, an adhesive of thermosetting type hardens in a shorter time. Air in the container portion of the smoothing condensers expands on heating and is exhausted outside. The air removes non hardened adhesives. It is probable that a through bores are formed in a sealant and a sealant resin intrudes. A ventilation hole provided the container portion prevents the formation of the through bores in the sealant and can improve productivity.

Further, in a controlling device integrated rotating electric machine in accordance with the present invention, a through hole is formed on a side face of the container portion which the heat sink has. The through hole may be closed with a filter. According to the controlling device integrated, rotating electric machine in accordance with the present invention, the embodiment can prevent the malfunction of the smoothing condensers owing to the intrusion of water through a ventilation hole of the container portion. The ventilation hole may be closed, after a last step is finished. Adhesives of room temperature curing type are allowed to be employed without any difficulty. Pasting of a water repellent filter to a through hole enhances the prevention of dew condensation in the container portion, Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a cover having a container portion swelling out towards a front side, a heat sink, attached to a rear side of the rotating electric machine's main body, attached to a rear side of the cover and having an opening portion formed at a location corresponding to the container portion which the cover has, a case containing the control board and the power module, fixed to a rear side of the heat sink, and formed of a power supply wiring and a grounding wiring connected to a battery placed outside, and a sealing resin body sealing the control board and the power module contained in the case, wherein the smoothing condenser, which the power converter circuit has, is joined, with the power supply wiring and the grounding wiring formed to the case, and is contained in the container portion which the cover has. According to the controlling device integrated rotating electric machine in accordance with the present invention, components in the container portion can be attached to the heat sink, after smoothing condensers are resin sealed. The embodiment makes it possible to confirm that a sealing resin does not leak into the container portion of the smoothing condensers, and then can have an increased reliability.

Embodiment 2.

Figure 12:
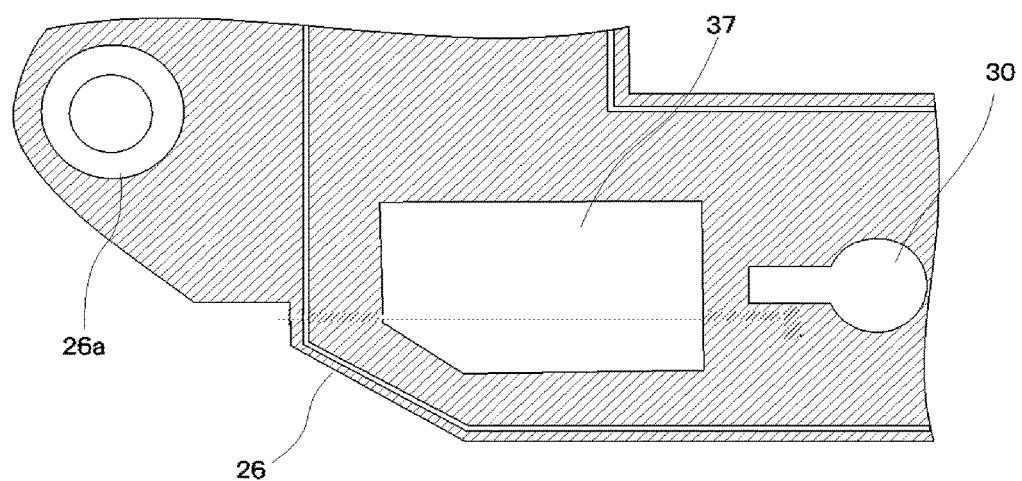
FIG. 12 is an illustration in accordance with Embodiment 2 of the present invention, for showing a top view of an opening portion formed to the case.

With reference to accompanying drawings, description is made about a controlling device integrated rotating electric machine in accordance with Embodiment 2 of the present invention. The present embodiment, like Embodiment 1, is a sample of the controlling device integrated rotating electric machine which is applied to the alternating current generating motor used for the assist driving of a motor vehicle and the generation of electric power. The controlling device integrated rotating electric machine 1 consists of a rotating electric machine's main body 2 and a controlling device 3. FIG. 12 shows the region A of the controlling device in accordance with the present embodiment, for illustrating an enlarged view of the case 26 viewed from the direction (the front side) of the heat sink 21. An opening portion 37 is formed in the region A of the case 26. The opening portion 37 of the case 26 is covered with a module substrate. A plurality of smoothing condensers 29 are connected to the module substrate at a step different from the step for assembling the controlling device 3, and then the module substrate and the smoothing condensers are provided in a module.

Figure 13:
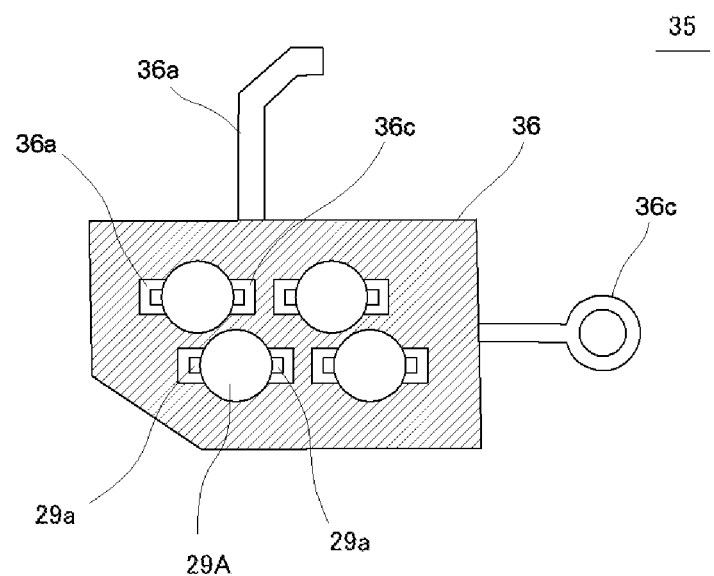
FIG. 13 is an illustration in accordance with Embodiment 2 of the present invention, for showing a constitutional top view of a module substrate.

FIG. 13 is a top view of the condenser module 35, viewed from the same direction (the front side) of FIG. 12. In the drawing, the module substrate 36 of the condenser module 35 is made from thermoplastic resins such as PPS, PBT and the like. A copper power supply wiring 36a and a copper grounding wiring 36c are integrally molded with the module substrate 36. The smoothing condensers 29 are installed on the power converter circuit 60 and absorb ripple currents which are produced by the operation of switching elements built-in a power module 23. Leads 29a of a smoothing condenser of surface mount type 29A are joined to a power supply wiring 36a and a grounding wiring 36c by soldering (not shown). The smoothing condensers 29 can employ an aluminum electrolytic capacitor, an electro conductive polymer capacitor, an electro conductive polymer hybrid aluminum electrolytic capacitor and the like.

The condenser module 35 is arranged in the case 26 at the location of the opening portion 37, from a direction where a controlling device cover 28 is installed. Thus, the opening portion 37 is closed out with the module substrate 36. The power supply wiring 36a formed on the condenser module 35 is to be connected with the power supply wiring 26a of the case 26. After the case 26 is installed on the heat sink 21, the grounding wiring 36c formed in the condenser module 35 is fastened by screws and connected to the heat sink 21. The module substrate 36 of the condenser module 35 may be formed of a glass epoxy resin and ceramics and a metal.

Figure 14:
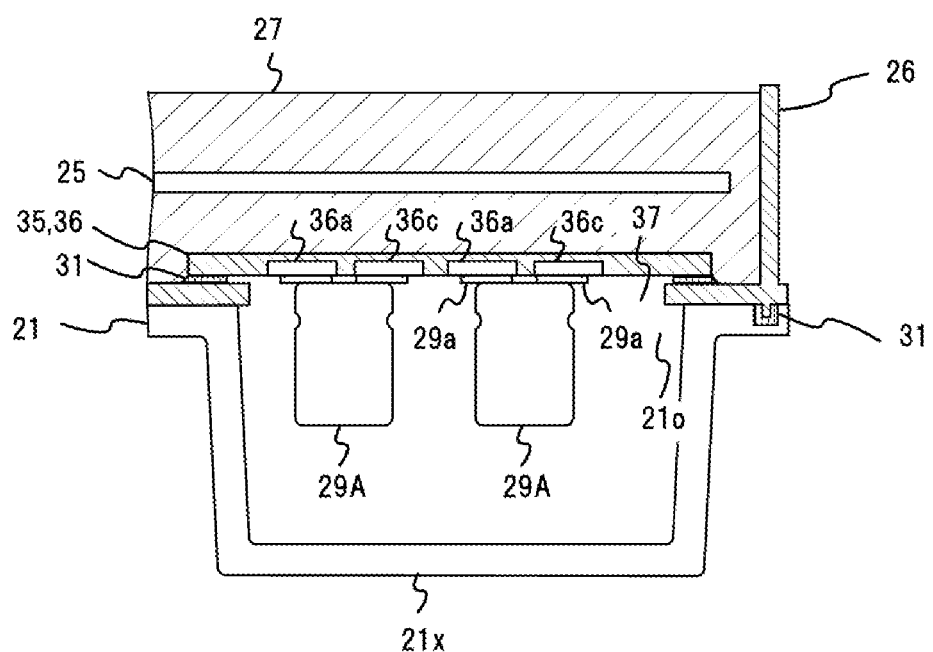
FIG. 14 is an illustration in accordance with Embodiment 2 of the present invention, for showing a sectional view of the controlling device where a resin sealed structure of smoothing condensers is provided.

FIG. 14 is a view of the constructional arrangement of the smoothing condensers 29 in accordance with the present embodiment, for illustrating the sectional view, like FIG. 6. A container portion 21x extends out in a direction opposite to the surface of the heat sink 21 on which the power module 23 is installed. The smoothing condensers of surface mount type 29A are contained in the room formed by the container portion 21x, the bottom face of the case 26 and the module substrate 36 of the condenser module 35. The opening portion 21o of the heat sink 21 is closed out with the bottom face of the case 26 and the module substrate 36, even if a sealing resin body 27 is formed on the inside of the case 26. Accordingly, the sealing resin body 27 does not intrude into the room where smoothing condensers 29 are stored.

Also in the embodiment according to the present invention, the surroundings of the smoothing condensers are not sealed, even if a power circuit portion 18, a field circuit portion 19 and a control circuit portion 20 are sealed with resins. Thus, the controlling device 3 can be improved in the reliability to humidity and vibration. Furthermore, in the embodiment according to the present invention, a plurality of smoothing condensers 29 are connected to the module substrate 36. A module including the smoothing condensers 29 and the module substrate 36 is provided at a step different from the step for assembling the controlling device 3. As for the condenser module, a plurality of smoothing condensers can be connected to the case 26 as a whole. Thereby, the embodiment can improve the productivity. Furthermore, defective condenser modules can be removed by an electric inspection before the installation to the case 26. Thereby, the embodiment can reduce the waste disposal cost.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case containing the control board and the power module, fixed to a rear side of the heat sink, and having an opening portion formed at a location corresponding to the container portion which the heat sink has, a module substrate formed of a power supply wiring and a grounding wiring connected to a battery placed outside and closing the opening portion formed to the case, and a sealing resin body sealing the control board and the power module contained in the case, wherein the smoothing condenser, which the power converter circuit has, is joined with the power supply wiring and the grounding wiring formed to the module substrate, and is contained in the container portion which the heat sink has.

According to the controlling device integrated rotating electric machine in accordance with the present invention, the opening portion of the container portion for storing smoothing condensers is closed out with a module substrate. Accordingly, the surroundings of the smoothing condensers are not sealed, when a power converter circuit and a control board are sealed with resins. Further, a plurality of smoothing condensers are connected to a module substrate to build a module beforehand. By connecting the smoothing condensers in the module to the case as a whole, the embodiment can improve the productivity of the controlling device. Furthermore, defective condenser modules can be removed by an electric inspection before the installation to the case. Thereby, the embodiment can reduce the waste disposal cost.

Embodiment 3.

Figure 15:
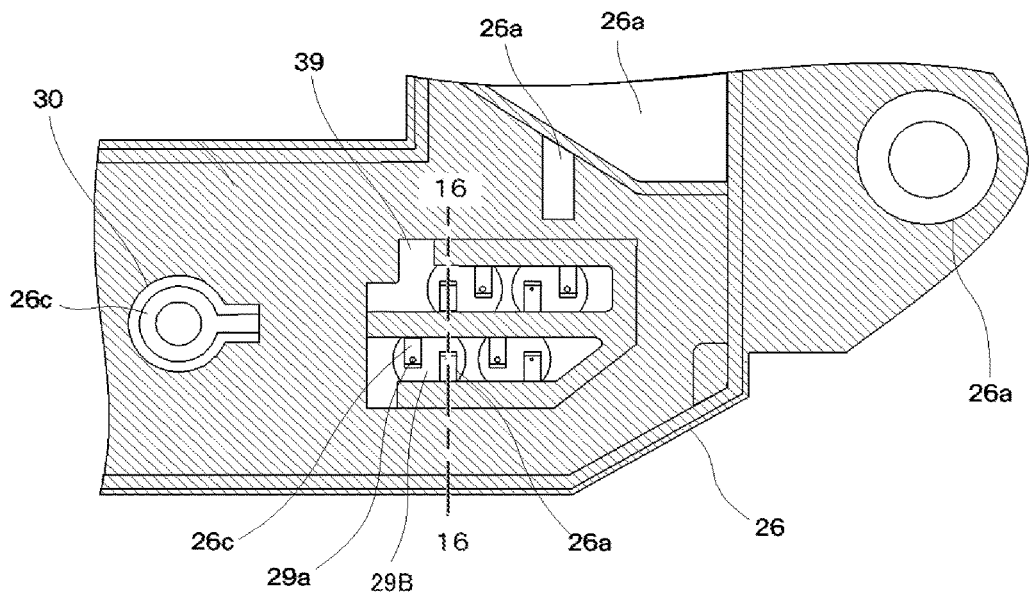
FIG. 15 is an illustration in accordance with Embodiment 3 of the present invention, for showing a top view of the case in a state where smoothing condensers are connected the case.

With reference to accompanying drawings, description is made about a controlling device integrated rotating electric machine in accordance with Embodiment 3 of the present invention. The present embodiment, like Embodiments 1 and 2, is a sample of the controlling device integrated rotating electric machine which is applied to the alternating current generating motor used for the assist driving of a motor vehicle and the generation of electric power. The controlling device integrated rotating electric machine 1 consists of a rotating electric machine's main body 2 and a controlling device 3. FIG. 15 shows the region A of the controlling device in accordance with the present embodiment, for illustrating an enlarged view of the case 26 viewed from the direction (the rear side) of the controlling device cover 28. An opening portion 39 is formed around a power supply wiring 26a and a grounding wiring 26c on the bottom face of the case 26, on account of production process reasons (a lid 38 is not shown in the drawing).

A power supply wiring 26a and a grounding wiring 26c of copper made are formed by insert molding on the bottom face of case 26. The grounding wirings 26c are fastened by screws and connected to the heat sink 21, after the case 26 is installed on the heat sink 21. The smoothing condensers of insertion mount type 29B absorb ripple currents which are produced by the operation of switching elements built-in the power module 23, and four smoothing condensers are connected in parallel. Leads 29a of the smoothing condenser are connected with a power supply wiring 26a and a grounding wiring 26c by welding. The smoothing condensers 29 can employ an aluminum electrolytic capacitor and an electro conductive polymer capacitor and an electro conductive polymer hybrid aluminum electrolytic capacitor and the like.

Figure 16:
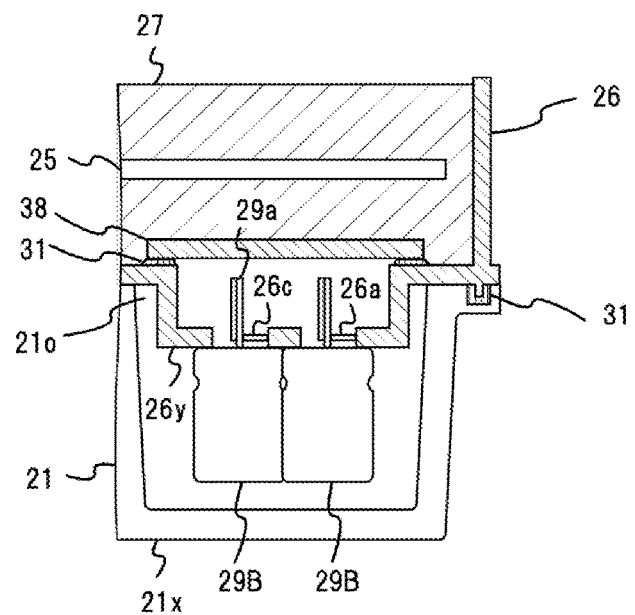
FIG. 16 is an illustration in accordance with Embodiment 3 of the present invention, for showing a sectional view of the controlling device where a resin sealed structure of smoothing condensers is provided.

FIG. 16 is an illustration which shows a constructional arrangement of smoothing condensers 29 in accordance with the present embodiment. The drawing is a sectional view of the controlling device 3 along a section line 16-16 of FIG. 15 and shows a section of the device viewed from a direction of the left side of FIG. 15. A power supply wiring 26a and a grounding wiring 26c are formed in the groove portion 26y of the case 26, and connected with a battery 50 placed outside. The smoothing condensers of insertion mount type 29B are contained, in a room formed by a container portion 21x, a bottom face (a groove portion 26y) of case 26 and a lid 38. The container portion 21x extends outward along a direction opposite to the surface of the heat sink 21 on which the power module 23 is installed. The opening portion 21o of the heat sink 21 is blocked up with a bottom face of the case 26 and the lid 38, even if the sealing resin body 27 is formed on the inside of the case 26. Accordingly, the sealing resin body 27 does not intrude into the room where smoothing condensers 29 are stored.

In this manner, the embodiment can improve the reliability to humidity and vibration of the controlling device 3, because areas surrounding smoothing condensers 29 are not sealed, even if the power circuit portion 18, the field circuit portion 19 and the control circuit portion 20 are sealed with resins. Smoothing condensers of insertion mount type 29B are used in the present embodiment, whereas smoothing condensers of surface mount type 29A are used in Embodiments 1 and 2. In a situation where the insertion mount type is employed as a smoothing condenser, an opening portion 39 needs to be formed in the surrounding area of a power supply wiring 26a and a grounding wiring 26c on the bottom face of the case 26, on account of production process reasons, when a power supply wiring 26a and a grounding wiring 26c are integrally molded to the case 26 for the connection with the smoothing condensers.

Then, the additional establishment of the lid 38 formed by thermoplastic resins such as PPS, PBT and the like, metals such as an aluminum alloy and the like, or ceramics and the like are necessary to prevent the intrusion of the sealing resin body 27 into the room where smoothing condensers 29 are stored. When the smoothing condensers of insertion mount type 29B are employed, an area for arranging condensers can be reduced in comparison with a case where the surface mount type is employed. The embodiment can down size the controlling device 3. Note that, the opening portion 39 can be blocked up with a sealant without using the lid 38, when the opening portion 39 is small in area.

Figure 17:
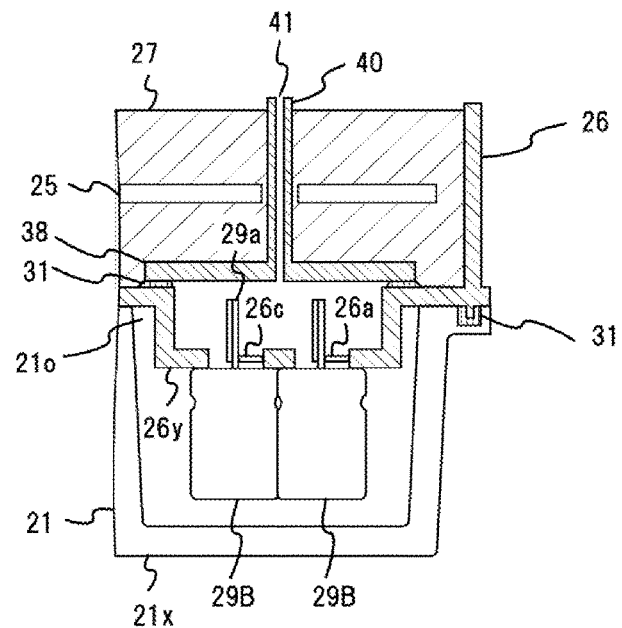
FIG. 17 is an illustration in accordance with Embodiment 3 of the present invention, for showing a sectional view of the resin sealed structure where a through hole is provided on a lid, in the controlling device.

FIG. 17 is a view illustrating another constructional arrangement of smoothing condensers 29 in accordance with the present embodiment, and for showing a sectional view of the case like FIG. 16. In the configuration shown in FIG. 9 according to Embodiment 1, a through hole 32 was provided in the container portion 21x of the heat sink 21. In the present embodiment, a chimney like structure 40 penetrating through the sealing resin body 27 is formed to the lid 38. The tip of the chimney like structure 40 protrudes from the surface of the sealing resin body 27 in a direction of the controlling device cover 28. Also in the present embodiment, the air expanded in the container portion of the smoothing condensers 29 can be exhausted from a ventilation hole 41, when a sealant 31 is thermally cured. The present embodiment has the similar advantageous effects like the construction shown in FIG. 9 of Embodiment 1.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case containing the control board and the power module, fixed to a rear side of the heat sink, and having a groove portion formed of a power supply wiring and a grounding wiring connected to a battery placed outside, and a sealing resin body sealing the control board and the power module contained in the case, wherein the smoothing condenser, which the power converter circuit has, is joined with the power supply wiring and the grounding wiring formed to the groove portion of the case, and is contained in the container portion which the heat sink has.

Further, in a controlling device integrated rotating electric machine in accordance with the present invention, a chimney like structure is provided to the lid, to penetrate through the sealing resin body. The controlling device integrated rotating electric machine, in accordance with the present invention, employs smoothing condensers of insertion mount type, in substitution for smoothing condensers of surface mount type here. Condensers of this type require an opening portion formed around electrodes on the bottom face of the case, when the electrodes for connection with the smoothing condensers are formed integrally to the case. A lid is added to close a container portion of the smoothing condensers. As a result, the area for arranging the smoothing condensers can be decreased and the controlling device can be reduced in size.

Embodiment 4.

Figure 18:
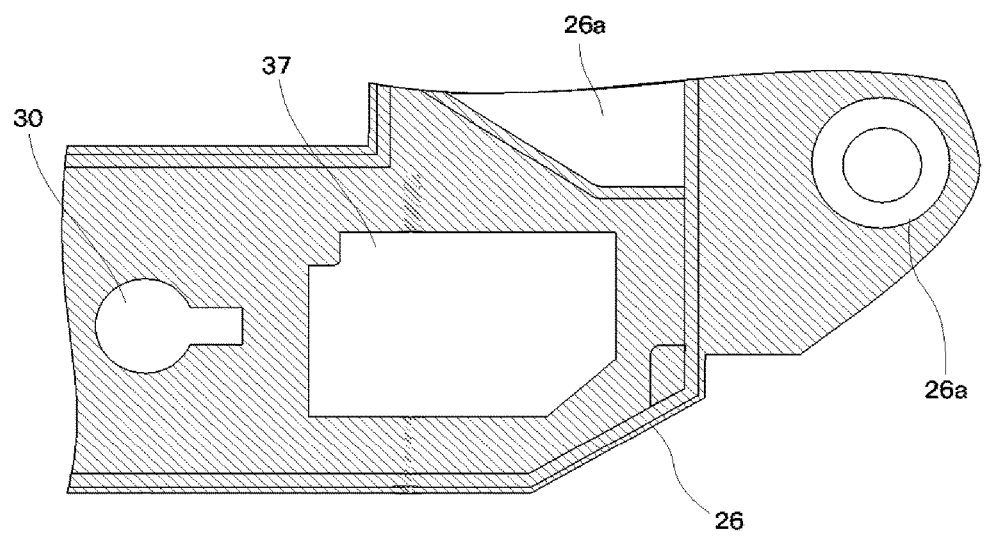
FIG. 18 is an illustration in accordance with Embodiment 4 of the present invention, for showing a top view of the case where an opening portion is formed.

With reference to accompanying drawings, description is made about a controlling device integrated rotating electric machine in accordance with Embodiment 4 of the present invention. The present embodiment, as well as Embodiments 1-3, shows a case where the controlling device integrated rotating electric machine is applied to an alternating current generating motor used for the assist driving of a motor vehicle and the generation of electric power. The controlling device integrated rotating electric machine includes a rotating electric machine's main body 2 and a controlling device 3. FIG. 18 shows the region A in accordance with the present embodiment, for illustrating an enlarged area viewed from a direction (the rear side) towards the case 26 from the controlling device cover 28. An opening portion 37 is formed in the region A of the case 26. A condenser module in accordance with the present embodiment is to be fixed to the opening portion 37 with adhesives.

Figure 19:
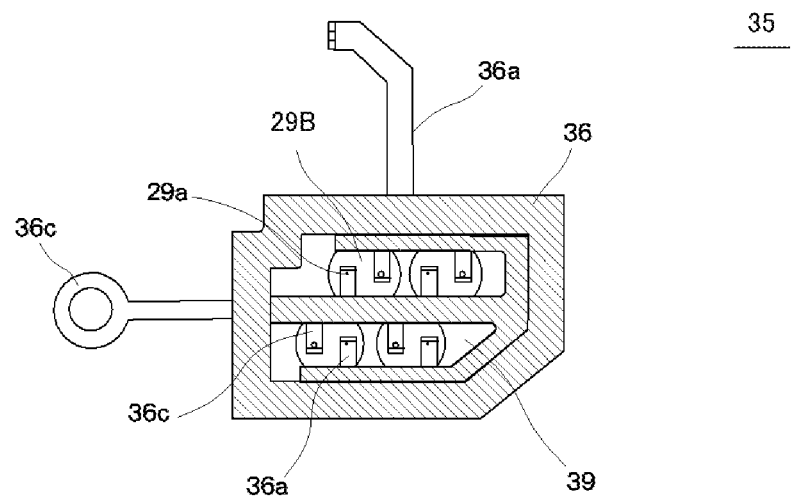
FIG. 19 is an illustration in accordance with Embodiment 4 of the present invention, for showing a constitutional top view of a module substrate.

FIG. 19 is a top view of a condenser module 35 viewed from the rear side. In the drawing, the module substrate 36 of the condenser module 35 is formed by thermoplastic resins like PPS, PBT and the like, and integrally molded with a copper power supply wiring 36*a* and a copper grounding wiring 36*c*. The insertion mount type is employed as smoothing condensers 29. The leads 29*a* of a smoothing condenser of insertion mount type 29B are connected to a power supply wiring 36*a* and a grounding wiring 36*c* by welding. The condenser module 35 is installed into the case 26, at the location of an opening portion 37, from a direction (the rear side) where a controlling device cover 28 is arranged.

The power supply wiring 36*a* of the condenser module is connected to a power supply wiring 26*a* of the case 26. The grounding wiring 36*c* is fastened by screws and connected to the heat sink 21, after the case 26 is installed in the heat sink 21. Aluminum electrolytic capacitors, electro conductive polymer capacitors, electro conductive polymer hybrid aluminum electrolytic capacitors and the like can be used as smoothing condensers of insertion mount type 29B. Glass epoxy resins, ceramics and metals can be employed for the module substrate 36 of the condenser module 35.

Figure 20:
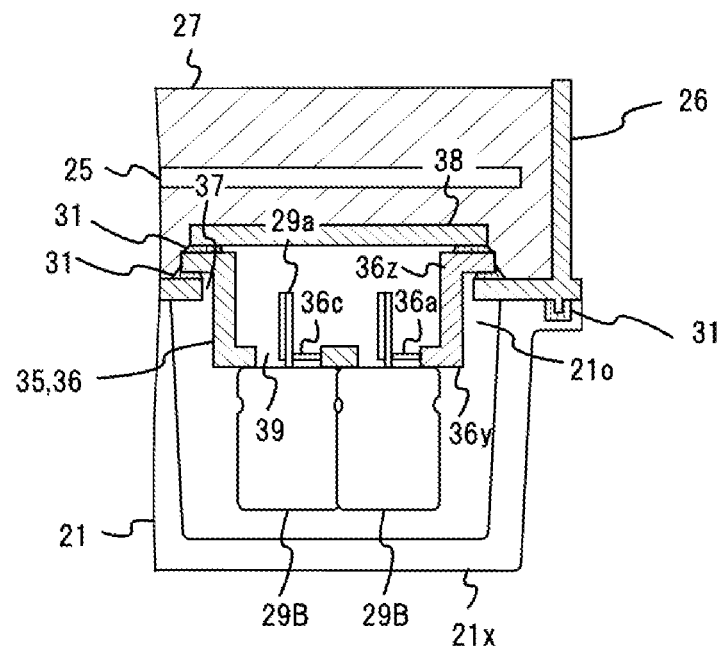
FIG. 20 is an illustration in accordance with Embodiment 4 of the present invention, for showing a sectional view of the controlling device where a resin sealed structure of smoothing condensers is provided.

FIG. 20 is an illustration showing the constructional arrangement of the smoothing condensers 29 in accordance with the present embodiment, and also showing a sectional view of the case like FIG. 16. The module substrate 36 has a brim portion 36*z* and a groove portion 36*y*. A power supply wiring 36*a* and a grounding wiring 36*c* are formed in the groove portion 36*y*. A lid 38 is fixed to the brim portion 36*z* which is owned by the module substrate 36. A container portion 21*x* extends out in a direction opposite to the surface of the heat sink 21 where the power module 23 is installed. Smoothing condensers of insertion mount type 29B are contained in a room formed by the container portion 21*x*, a bottom face of the case 26, a module substrate 36 of the condenser module 35, and a lid 38. The sealing resin body 27 does not intrude into the room where smoothing condensers of insertion mount type 29B are contained, because an opening portion 21*o* of the heat sink 21 is closed up with the bottom face of the case 26 and the module substrate 36 and the lid 38, even if the sealing resin body 27 is formed on the inside of the case 26. Note that, an opening portion 39 can be blocked up with sealant without using a lid 38, when the opening portion 39 is small in area.

In this way, the controlling device can be improved in the reliability to humidity and vibration, also in the present embodiment, because the surroundings of the smoothing condensers are not sealed, even if the power circuit portion 18, the field circuit portion 19 and the control circuit portion 20 are sealed with resins. Further, in the present embodiment, the productivity of the controlling device 3 is improved and the waste disposal cost is effectively reduced, because a plurality of smoothing condensers 29 are integrated in a module. Furthermore, because smoothing condensers of insertion mount type 29B are employed to the controlling device, an area for arranging condensers can be reduced, and the controlling device 3 can be reduced in size effectively.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink having a container portion swelling out towards a front side and attached to a rear side of the rotating electric machine's main body, a case containing the control board and the power module, fixed to a rear side of the heat sink, and having an opening portion formed at a location corresponding to the container portion which the heat sink has, a module substrate having a brim portion and a groove portion, the groove portion formed of a power supply wiring and a grounding wiring connected to a battery placed outside, and a sealing resin body sealing the control board and the power module contained, in the case, wherein the groove portion, which the module substrate has, penetrates through the opening portion formed to the case, the smoothing condenser, which the power converter circuit has, is joined with the power supply wiring and the grounding wiring formed to the module substrate, and is contained in the container portion which the heat sink has According to the controlling device integrated rotating electric machine in accordance with the present embodiment, the rotating electric machine can have improvement in downsizing and productivity, by employing the smoothing condensers of insertion type and providing a plurality of smoothing condensers in a module.

Embodiment 5.

Figure 21:
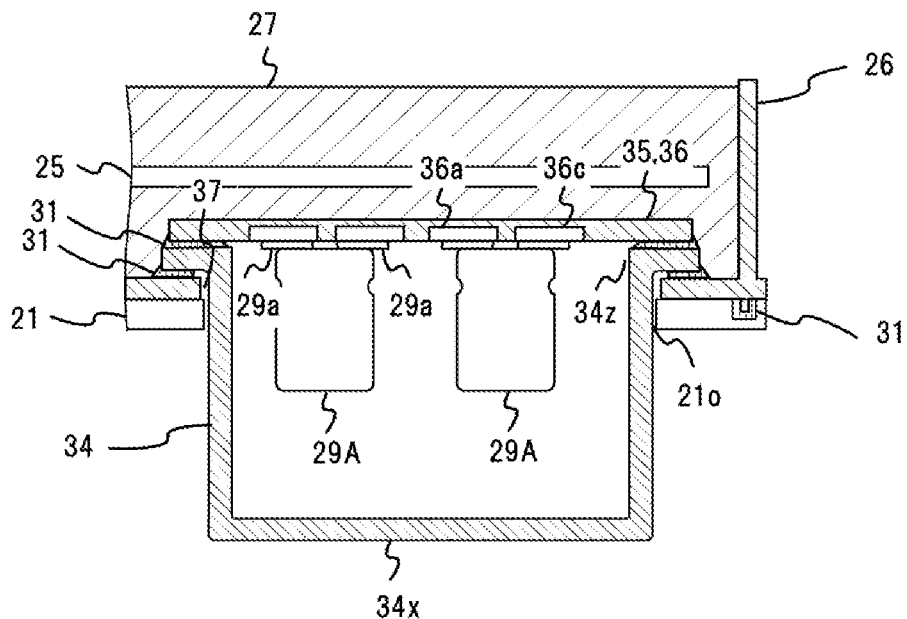
FIG. 21 is an illustration in accordance with Embodiment 5 of the present invention, for showing a sectional view of the controlling device where a resin sealed structure of smoothing condensers is provided.

With reference to accompanying drawings, description is made about a controlling device integrated rotating electric machine in accordance with Embodiment 5 of the present invention. The present embodiment, as well as Embodiments 1-4, shows a case where the controlling device integrated rotating electric machine is applied to an alternating current generating motor used for the assist driving of a motor vehicle and the generation of electric power. The controlling device integrated rotating electric machine 1 includes a rotating electric machine's main body 2 and a controlling device 3. FIG. 21 is a view for illustrating the constructional arrangement of smoothing condensers 29 in accordance with the present embodiment, and also for illustrating a sectional view of the region A according the present embodiment. An opening portion 21o (a first opening portion) is formed to the heat sink 21, like FIG. 11. An opening portion 37 (a second opening portion) is formed to the case 26, like FIG. 12. The opening portion 21o and the opening portion 37 are formed in the same location. A power supply wiring 36a and a grounding wiring 36c are formed to a module substrate 36. A cover 34 has a brim portion 34z and a container portion 34x. The brim portion 34z is fixed to the case 26 with an adhesive.

A power supply wiring 36a and a grounding wiring 36c are formed to a module substrate 36. The module substrate 36 is glued with the brim portion 34z which the cover 34 has. In the present embodiment, smoothing condensers of surface mount type 29A are connected to the module substrate 36, and moreover, a condenser module 35 with a cover is constructed by attaching a cover 34 to the module substrate 36. Smoothing condensers 29, in a state of the module, have been already stored in the room (a container portion 34x) that is formed by the module substrate 36 and the cover 34. An opening portion 37 and an opening portion 21o, through which the cover 34 penetrates, are provided on the bottom face of the case 26 and in the heat sink 21. Those openings are blocked up with the module substrate 36 and the cover 34.

Figure 22:
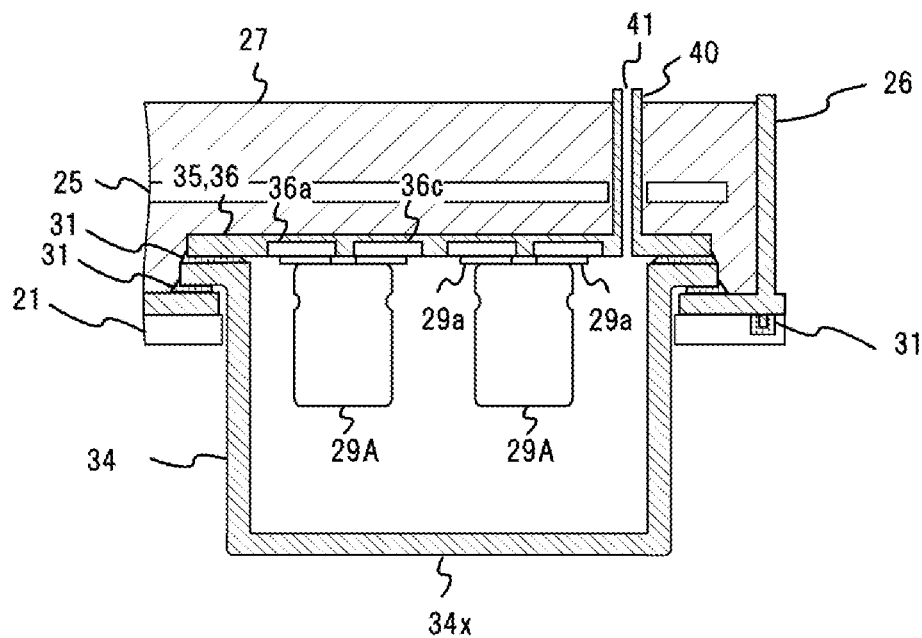
FIG. 22 is an illustration in accordance with Embodiment 5 of the present invention, for showing a sectional view of the resin sealed structure where a through hole is provided to the module substrate in the controlling device.

FIG. 22 is a view for illustrating another constructional arrangement of the smoothing condensers 29 in accordance with the present embodiment, and also for illustrating a sectional view of the case like FIG. 21. In the present embodiment, a chimney like structure 40 is formed on the bottom face of the module substrate 36. The tip of the chimney like structure 40 protrudes from the surface of the sealing resin body 27 towards the direction of the controlling device cover 28. The air in the container portion of smoothing condensers 29 expands and can be exhausted from a ventilation hole 41, when a sealant 31 is thermally cured. The present embodiment has the similar advantageous effects like the construction shown in FIG. 17.

Figure 23:
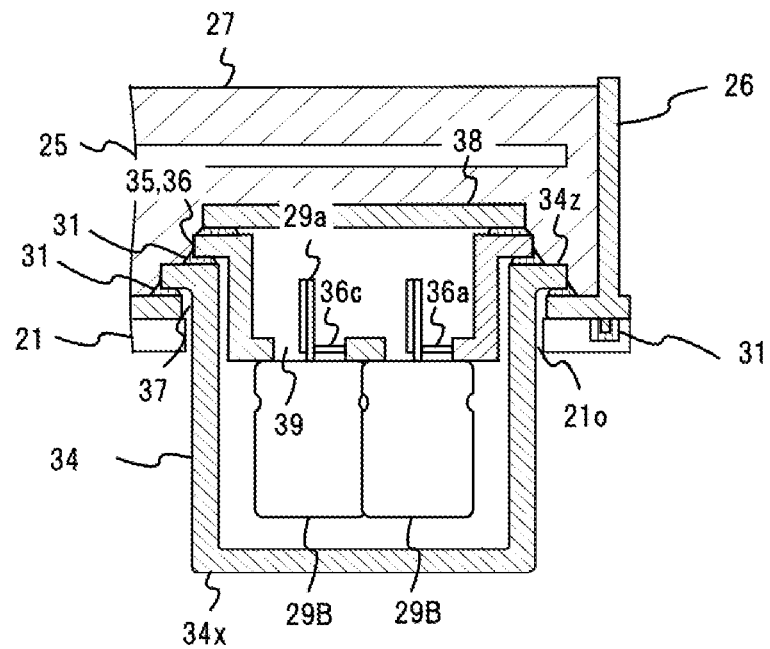
FIG. 23 is an illustration in accordance with Embodiment 5 of the present invention, for showing a sectional view of the resin sealed structure where a module substrate and a lid are provided for storing smoothing condensers.

FIG. 23 is a view for illustrating another constructional arrangement of the smoothing condensers 29 in accordance with the present embodiment, and also for illustrating a sectional view of the case like FIG. 20. In the present embodiment, by employing smoothing condensers of insertion mount type 29B, the condenser module 35 with a lid is constructed, like a configuration shown in FIG. 20. Smoothing condensers 29 are integrated in a module and already stored in the room that is formed by the module substrate 36 and the cover 34 and the lid 38. An opening portion 37 (a second opening portion) and an opening portion 21o (a first opening portion), through which the cover 34 penetrates, are provided on the bottom face of the case 26 and in the heat sink 21. Those openings are closed up with the module substrate 36 and the cover 34 and a lid 38. Also, an opening 39 can be blocked up with a sealant without using the lid 38, when the opening 39 is small in area.

Note that, in the present embodiment, the cover 34 can be formed of thermoplastic resins such as PPS, PBT and the like or metals such as an aluminum alloy. Also, if thermoplastic resins such as PPS, PBT and the like are employed to the module substrate 36, a power supply wiring 36a and a grounding wiring 36c can be integrally molded with the module substrate 36. In addition, the module substrate 36 can employ glass epoxy resins and ceramics and metals. Furthermore, the lid 38 can be formed of thermoplastic resins such as PPS and PBT, metals such as an aluminum alloy, or ceramics and others.

The controlling device can be improved in the reliability to humidity and vibration, because a sealing resin body 27 does not intrude into the room where smoothing condensers 29 are stored, even if the sealing resin body 27 is formed on the inside of the case 26 in these three embodiments. Furthermore, in any of these embodiments, a plurality of smoothing condensers 29 are integrated in a module. The embodiments improve the productivity of the controlling device and are effective in reducing the waste disposal cost. Note that, the embodiment of FIG. 23 employs smoothing condensers of insertion mount type 29B. Accordingly, an area for arranging the condensers can be decreased, and the controlling device 3 can be reduced in size effectively.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink attached to a rear side of the rotating electric machine's main body and having a first opening portion, a case containing the control board and the power module, fixed to a rear side of the heat sink, and having a second opening portion formed at the same location with the first opening portion which the heat sink has, a cover having a brim portion and a container portion, the brim portion fixed to the case or the heat sink with an adhesive, a module substrate formed of a power supply wiring and a grounding wiring connected to a battery placed outside and covering the cover, and a sealing resin body sealing the control board and the power module contained in the case, wherein the container portion, which the cover has, penetrates through the first opening portion and the second opening portion, the smoothing condenser, which the power converter circuit has, is joined with the power supply wiring and the grounding wiring formed to the module substrate, and is contained in the container portion which the cover has. Further, in a controlling device integrated rotating electric machine in accordance with the present embodiment, a chimney like structure is provided to the module substrate to penetrate through the sealing resin body. According to the controlling device integrated rotating electric machine in accordance with the present invention, advantageous effects like Embodiments 1-4 can be provided to the rotating electric machine.

Further, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a heat sink attached to a rear side of the rotating electric machine's main body and having a first opening portion, a case containing the control board and the power module, fixed to a rear side of the heat sink, and having a second opening portion formed at the same location with the first opening portion which the heat sink has, a cover having a first brim portion and a container portion, the brim portion fixed to the case or the heat sink, a module substrate having a second brim portion and a groove portion, the second brim portion attached to the first brim portion which the cover has and the groove portion formed of a power supply wiring and a grounding wiring connected to a battery placed outside, and a sealing resin body sealing the control board and the power module contained in the case, wherein the container portion, which the cover has, penetrates through the first opening portion and the second opening portion, the smoothing condenser, which the power converter circuit has, is joined with the power supply wiring and the grounding wiring formed to the module substrate, and is contained in the container portion which the cover has. According to the controlling device integrated rotating electric machine in accordance with the present invention, advantageous effects like Embodiments 1-4 can be provided to the rotating electric machine.

Embodiment 6.

Figure 24:
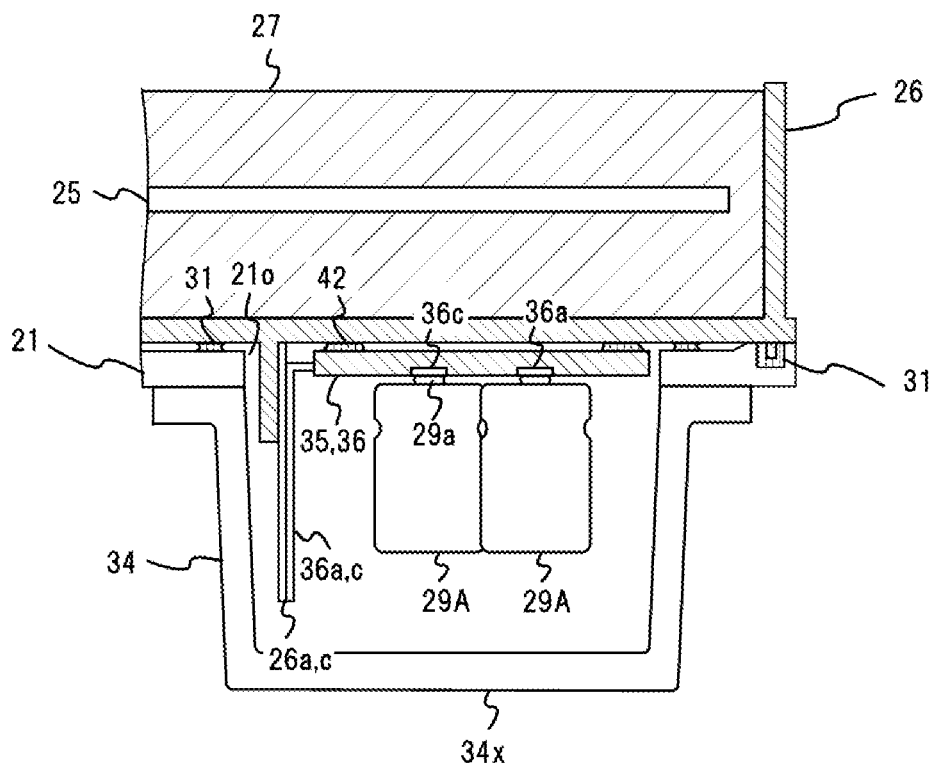
FIG. 24 is an illustration in accordance with Embodiment 6 of the present invention, for showing a sectional view of the resin sealed structure where smoothing condensers are provided in the controlling device.

With reference to accompanying drawings, description is made about a controlling device integrated rotating electric machine in accordance with Embodiment 6 of the present invention. The present embodiment, as well as Embodiments 1-5, shows a case where the controlling device integrated rotating electric machine is applied to an alternating current generating motor used for the assist driving of a motor vehicle and the generation of electric power. The controlling device integrated rotating electric machine 1 includes a rotating electric machine's main body 2 and a controlling device 3. FIG. 24 is a view for illustrating the constructional arrangement of the smoothing condensers 29 in accordance with the present embodiment, and also for illustrating a section of the region A according to the present embodiment. A cover 34 has a container portion 34x swelling out towards the front side and is attached to the front side of a heat sink 2. The heat sink 21 is attached to the rear side of the rotating electric machine's main body 2. An opening portion 21o of the heat sink 21 is formed at the location corresponding to the container portion 34x which the cover has. A case 26 is fixed to the rear side of the heat sink 21.

A module substrate 36 is fixed to the case 26 with an adhesive, and, moreover, a power supply wiring 36a and a grounding wiring 36c are formed to connect with a battery 50. The power supply wirings 36a are integrally molded with the module substrate 36 and extend out along the direction of the heat sink 21. Smoothing condensers of surface mount type 29A are connected to the module substrate 36 to make a condenser module 35. An opening portion 21o is formed in the heat sink 21. A power supply wiring 26a and a grounding wiring 26c extend out in the direction of the cover 34, and those wirings and the condenser module 35 penetrate through the opening portion 21o. The module substrate 36 is fixed on the bottom face of the case 26 with an adhesive 42.

The power supply wiring 26a and the grounding wiring 26c of the case 26 extend out along the direction of the heat sink 21. The power supply wiring 36a and the grounding wiring 36c of the module substrate 36 are respectively joined by welding with the power supply wiring 26a and the grounding wiring 26c. The cover 34 is arranged on the heat sink 21, and smoothing condensers 29 are stored in the room formed by the bottom face of the case 26 and the heat sink 21 and the cover 34.

Figure 25:
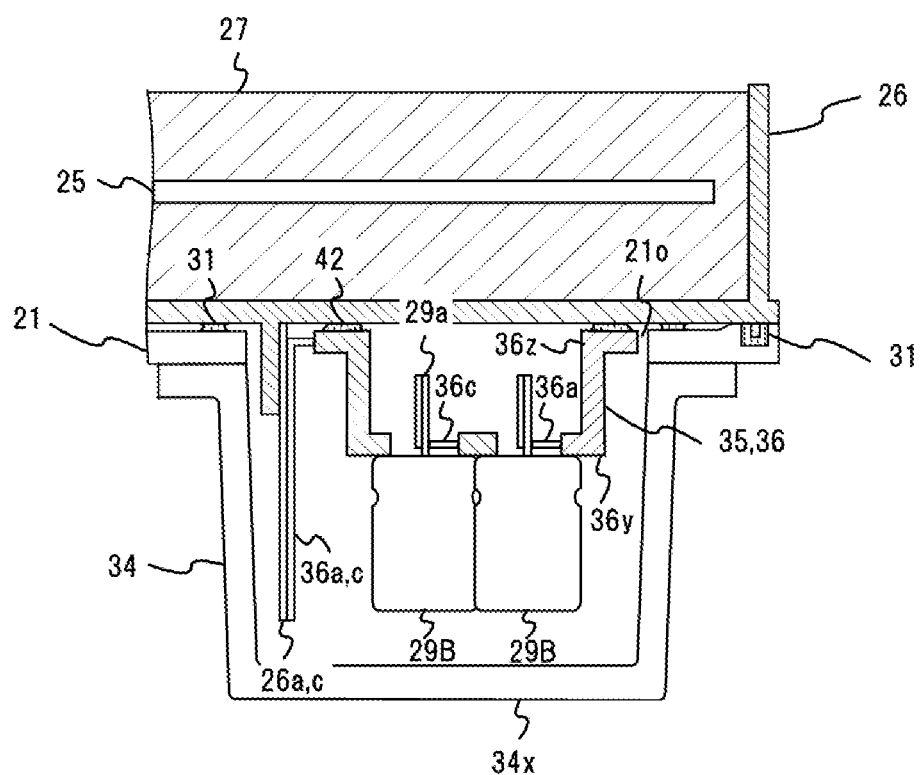
FIG. 25 is an illustration in accordance with Embodiment 6 of the present invention, for showing a sectional view of the resin sealed structure where a module substrate and a cover are provided for storing smoothing condensers.

FIG. 25 is a view for illustrating another constructional arrangement of the smoothing condensers 29 in accordance with the present embodiment, and also for illustrating a sectional view of the case like FIG. 24. In the present embodiment, a condenser module 35 is constructed by employing smoothing condensers of insertion mount type 29B. The module substrate 36 has a brim portion 36z and a groove portion 36y. The brim portion 36z is fixed to the case 26 with an adhesive, and beside that, a power supply wiring 36a and a grounding wiring 36c are formed in a groove portion 36y to connect with the battery 50. The power supply wirings 36a are integrally molded with the module substrate 36 and extend out along the direction of the heat sink 21. The smoothing condensers of insertion mount type 29B are connected to the module substrate 36 to make a condenser module 35. An opening portion 21o is formed in the heat sink 21. A power supply wiring 26a and a grounding wiring 26c extend out along the direction of the cover 34, and those wirings and the condenser module 35 penetrate through the opening portion 21o. The module substrate 36 is fixed on the bottom face of the case 26 with an adhesive 42.

The power supply wirings 26a and the grounding wiring 26c of the case 26 extend out along the direction of the heat sink 21. The power supply wirings 36a and the grounding wirings 36c of the module substrate 36 are respectively joined by welding with the power supply wirings 26a and the grounding wiring 26c. The cover 34 is arranged on the heat sink 21, and smoothing condensers 29 are contained in the room formed by the bottom face of the case 26 and the heat sink 21 and the cover 34.

Note that, in the present embodiment, the module substrate 36 can be molded integrally with the power supply wirings 36a and the grounding wiring 36c, if thermoplastic resins such as PPS, PBT and the like are used. In addition, glass epoxy resins and ceramics and metals can be employed in the module substrate 36. Further, the cover 34 can be formed of thermoplastic resins such as PPS, PBT and the like or metals like an aluminum alloy, and is fixed to the heat sink 21 by screws (not shown) or with an adhesive (not shown) or by the both.

In a case where a thermal curing type is employed as an adhesive, air inside the cover 34 expands on heating and is exhausted outside. The air removes non hardened adhesive, and a through bores are formed in an adhesion portion. It is probable that water intrudes while in use and reduces the reliability of smoothing condensers. The smoothing condensers 29 may be damp proof coated with a fluoric resin, a silicone resin, a polyolefin resin, an acrylic acid resin, an electric insulating varnish and the like. Alternatively, a through hole may be provided to the cover 34 beforehand. The through hole may be stuffed with a filter having waterproof property and aeration property, containing porous films of ethylene fluoride.

According to the present embodiment, it is possible to install the smoothing condensers 29 in the case, after the resin sealing process of the power circuit portion 18, the field circuit portion 19 and the control circuit portion 20 stored in the case 26 is completed. The embodiment can prevent the performance degradation and the reliability degradation of the smoothing condensers, owing to the heat for thermally curing the sealing resin body 27. Because the surroundings of the smoothing condensers 29 are not sealed with resins, the reliability to humidity and vibration can be improved. Furthermore, the present embodiment can improve the productivity of the controlling device and reduce the waste disposal cost for the device, because a plurality of smoothing condensers 29 are integrated in a module.

Accordingly, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a cover having a container portion swelling out towards a front side, a heat sink, attached to a rear side of the rotating electric machine's main body, attached to a rear side of the cover and having an opening portion formed at a location corresponding to the container portion which the cover has, a case containing the control board and the power module and fixed to a rear side of the heat sink, a module substrate fixed to a front side of the case and formed of a power supply wiring and a grounding wiring connected to a battery placed outside, and a sealing resin body sealing the control board and the power module contained in the case, wherein the smoothing condenser, which the power converter circuit has, is joined with the power supply wiring and the grounding wiring formed to the module substrate, and is contained in the container portion which the cover has.

Further, a controlling device integrated rotating electric machine in accordance with the present embodiment contains: a rotating electric machine's main body having a rotor winding and a stator winding, a power converter circuit connected to the rotor winding and the stator winding and having a control board and a power module and a smoothing condenser, a cover having a container portion swelling out towards a front side, a heat sink, attached to a rear side of the rotating electric machine's main body, attached to a front side of the cover and having an opening portion formed at a location corresponding to the container portion which the cover has, a case containing the control board and the power module and fixed to a rear side of the heat sink, a module substrate having a brim portion and a groove portion, the brim portion fixed to a front side of the case and the groove portion formed of a power supply wiring and a grounding wiring connected to a battery placed outside, and a sealing resin body sealing the control board and the power module contained in the case, wherein the smoothing condenser, which the power converter circuit has, is joined with the power supply wiring and the grounding wiring formed to the module substrate, and is contained in the container portion which the cover has. According to the controlling device integrated rotating electric machine in accordance with the present embodiment, advantageous effects like Embodiments 1-5 can be provided to the rotating electric machine.

In the scope of the present invention, the embodiments thereof can freely be combined with one another and can appropriately be modified or omitted.

DENOTATION OF REFERENCE NUMERALS

1 controlling device integrated rotating electric machine, 2 rotating electric machine's main body, 3 controlling device, 4 rotor shaft, 5 rotor, 6 rotor winding, 7 front bracket, 8 rear bracket, 9 bearing, 10 bearing, 11 stator winding, 12 stator, 13 pulley, 14 rotational position sensing detector, 15 electric slip rings, 16 brush holder, 17 brush, 18 power circuit portion, 19 field circuit portion, 20 control circuit portion, 21 heat sink, 22 heat radiating fins, 23 power module, 23a power supply wiring, 23b control signal wiring, 23c stator winding wiring, 23d ground wiring, 24 field module, 24a power supply 24b control signal wiring, 24c1 plus brush wiring, 24c2 minus brush wiring, 24d grounding wiring, 25 control board, 26 case, 26a power supply wiring, 26b stator winding wiring, 26c grounding wiring, 27 sealing resin body, 28 controlling device cover, 29 smoothing condenser, 29a lead, 30 opening portion, 31 sealant, 32 through hole, 33 filter, 34 cover, 35 condenser module, 36 module substrate, 36a power supply wiring, 36c grounding wiring, 37 opening portion, 38 lid, 39 opening portion, 40 chimney like structure, 41 ventilation hole, 42 adhesive, 50 battery, 60 power converter circuit

What is claimed is:

1. A controlling device integrated rotating electric machine comprising:
    a rotating electric machine's main body having a rotor winding and a stator winding,
    a power converter circuit connected to the rotor winding and the stator winding and having a control board, a power module and a smoothing condenser,
    a heat sink attached to a rear side of the rotating electric machine's main body and having heat radiating fins formed on a front side,
    a case fixed to the rear side of the heat sink, the case containing the control board and the power module of the power converter circuit,
    a container portion extending outward towards a front side from the case, and
    a sealing resin body sealing the control board and the power module contained in the case,
    wherein the smoothing condenser of the power converter circuit is contained in the container portion.

2. The controlling device integrated rotating electric machine as set forth in claim 1, wherein the heat sink has the container portion.

3. The controlling device integrated rotating electric machine as set forth in claim 2, wherein the case has a power supply wiring and a grounding wiring connected to a battery placed outside, and the smoothing condenser is joined with the power supply wiring and the grounding wiring.

4. The controlling device integrated rotating electric machine as set forth in claim 2,
    wherein an enclosing bund member made of a resin is provided to the case to surround the smoothing condenser.

5. The controlling device integrated rotating electric machine as set forth in claim 2, wherein a through hole is formed on a bottom face of the container portion of the heat sink.

6. The controlling device integrated rotating electric machine as set forth in claim 5, wherein the bottom face of the container portion is slanted.

7. The controlling device integrated rotating electric machine as set forth in claim 2, wherein a through hole is formed on a side face of the container portion of the heat sink.

8. The controlling device integrated rotating electric machine as set forth in claim 5, wherein the through hole is closed with a filter.

9. The controlling device integrated rotating electric machine as set forth in claim 1, further comprising a cover attached to the front side of the heat sink, the cover having the container portion,
    wherein the heat sink has an opening portion formed at a location corresponding to the container portion of the cover.

10. The controlling device integrated rotating electric machine as set forth in claim 2, further comprising a module substrate formed of a power supply wiring and a grounding wiring connected to a battery placed outside,
 wherein the case has an opening portion formed at a location corresponding to the container portion which the heat sink has and closes the opening portion formed to the case.

11. The controlling device integrated rotating electric machine as set forth in claim 2, wherein the case has a groove portion formed of a power supply wiring and a grounding wiring connected to a battery placed outside.

12. The controlling device integrated rotating electric machine as set forth in claim 11, wherein the groove portion of the case is closed with a lid.

13. The controlling device integrated rotating electric machine as set forth in claim 12, wherein a chimney like structure is provided to the lid to penetrate through the sealing resin body.

14. The controlling device integrated rotating electric machine as set forth in claim 2, further comprising a module substrate formed of a power supply wiring and a grounding wiring connected to a battery placed outside,
 wherein the case has an opening portion formed at a location corresponding to the container portion which the heat sink has and closes the opening portion formed to the case.

15. The controlling device integrated rotating electric machine as set forth in claim 14,
 wherein the groove portion which the module substrate has is closed with a lid.

16. The controlling device integrated rotating electric machine as set forth in claim 1, further comprising
 a cover having a brim portion and the container portion, the brim portion fixed to the case or the heat sink with an adhesive, and
 a module substrate formed of a power supply wiring and a grounding wiring connected to a battery placed outside and covering the cover,
 wherein the heat sink has a first opening portion, the case has a second opening portion and
 the container portion, which the cover has, penetrates through the first opening portion and the second opening portion.

17. The controlling device integrated rotating electric machine as set forth in claim 16,
 wherein a chimney like structure is provided to the module substrate to penetrate through the sealing resin body.

18. The controlling device integrated rotating electric machine as set forth in claim 1, further comprising
 a cover having a brim portion and the container portion, the brim portion fixed to the case or the heat sink with an adhesive,
 a module substrate having a second brim portion and a groove portion, the second brim portion attached to the first brim portion which the cover has and the groove portion formed of a power supply wiring and a grounding wiring connected a the battery placed outside, and
 wherein the heat sink has a first opening portion,
 the case has a second opening portion formed at the same location with the first opening portion which the heat sink has,
 the container portion, which the cover has, penetrates through the first opening portion and the second opening portion.

19. The controlling device integrated rotating electric machine as set forth in claim 18, wherein the groove portion, which the module substrate has, is closed with a lid.

20. The controlling device integrated rotating electric machine as set forth in claim 1, further comprising
 a cover having the container portion, and
 a module substrate formed of a power supply wiring and a grounding wiring connected to the battery placed outside,
 wherein the heat sink has an opening portion formed at a location corresponding to the container portion which the cover has, and
 the module substrate is fixed to a front side of the case.

21. The controlling device integrated rotating electric machine as set forth in claim 1, further comprising
 a cover having the container portion, and
 a module substrate having a brim portion and a groove portion, the brim portion fixed to a front side of the case and the groove portion formed of a power supply wiring and a grounding wiring connected to a battery placed outside,
 wherein the heat sink has an opening portion formed at a location corresponding to the container portion which the cover has.

22. The controlling device integrated rotating electric machine as set forth in claim 7, wherein the through hole is closed with a filter.

* * * * *